US012681329B2

(12) United States Patent
Ryan et al.

(10) Patent No.: US 12,681,329 B2
(45) Date of Patent: Jul. 14, 2026

(54) CONTOUR PRISM LENS WITH PROGRESSIVE POWER

(71) Applicant: Newton, Inc., Coppell, TX (US)

(72) Inventors: Jason Robert Ryan, Mission Viejo, CA (US); Ferenc Raksi, Laguna Hills, CA (US)

(73) Assignee: Newton, Inc., Coppell, TX (US)

( * ) Notice: Subject to any disclaimer, the term of this patent is extended or adjusted under 35 U.S.C. 154(b) by 318 days.

(21) Appl. No.: 18/324,898

(22) Filed: May 26, 2023

(65) Prior Publication Data

US 2024/0393618 A1    Nov. 28, 2024

Related U.S. Application Data

(63) Continuation of application No. 18/324,812, filed on May 26, 2023.

(51) Int. Cl.
*G02C 7/06* (2006.01)
*G02C 7/14* (2006.01)

(52) U.S. Cl.
CPC ............. *G02C 7/066* (2013.01); *G02C 7/063* (2013.01); *G02C 7/14* (2013.01)

(58) Field of Classification Search
CPC ... G02C 7/022; G02C 7/061–068; G02C 7/14
USPC ........................................ 351/159.42–159.47
See application file for complete search history.

(56) References Cited

U.S. PATENT DOCUMENTS 7,104,647 B2    9/2006  Krall
8,042,940 B2    10/2011 Krall et al.

8,287,124 B2    10/2012 Krall et al.
8,425,034 B2 *   4/2013 Wietschorke .......... G02C 7/028
                                                351/159.45
10,048,512 B2    8/2018 Krall et al.
2006/0139571 A1  6/2006 Poulain et al.
2013/0235336 A1 * 9/2013 Kozu ..................... G02C 7/066
                                                351/159.75
2015/0253587 A1 * 9/2015 Carmon ................. G02C 7/063
                                                351/159.42
2017/0351116 A1 * 12/2017 Kaga ..................... G02C 7/063
2017/0371181 A1 * 12/2017 Kaga ..................... G02C 7/063

(Continued)

FOREIGN PATENT DOCUMENTS

WO        2013-081592 A1    6/2013
WO        2015-120456 A1    8/2015

*Primary Examiner* — Nicholas R. Pasko

(57) ABSTRACT

A contour prism progressive lens has a position dependent optical power and a position dependent horizontal prism, and a distance-vision reference point and a near-vision reference point. It is characterized by a coordinate system with its vertical axis running through the distance-vision reference point and has an optical power at the near-vision power reference point that exceeds the optical power at the distance-vision reference point by a value between 0.25 diopter and 1.0 diopter. The horizontal prism on the vertical axis at a vertical coordinate of the near-vision reference point differs from the horizontal prism at the distance-vision reference point by more than 0.2 prism diopter base-in; and the optical power along a horizontal crosscut of the contour prism progressive lens through the near-vision reference point has a broad maximum where the region where the optical power is at least 85% of its peak is at least 5 mm wide.

8 Claims, 21 Drawing Sheets

(56)                    References Cited

U.S. PATENT DOCUMENTS

| 2018/0004010 A1* | 1/2018 | Kaga | G02C 7/066 |
| 2021/0271108 A1* | 9/2021 | Kozu | G02C 7/063 |
| 2024/0393618 A1 | 11/2024 | Ryan | |

* cited by examiner

CONTOUR PRISM LENS WITH PROGRESSIVE POWER

CROSS REFERENCE TO RELATED APPLICATION

This patent application is a continuation of U.S. patent application Ser. No. 18/324,812, entitled "Contour prism lens with progressive power", to J. Ryan and F. Raksi, which is hereby incorporated in its entirety by reference.

FIELD OF INVENTION

This invention relates generally to improved spectacle lenses, in more detail to spectacle lenses that reduce eye strain and help the eyes to improve vergence.

BACKGROUND

With normal vision, an individual is able to focus at objects located at different distances. Early in life, an individual is typically capable of focusing on distant objects, referred to as distance-vision, as well as on near objects, referred to as near-vision. The optical system of the eye uses numerous muscles to focus during distance-vision and near-vision. These muscles adjust various aspects of the eye when transitioning between distance-vision and near-vision. The muscle adjustments include making subtle changes to the shape of the crystalline lens to adjust the focus of the lens, rotating the eyeballs to rotate their optical axes, and changing the size of the pupils.

Presbyopia is a natural deterioration of near vision caused by loss of flexibility in the eye's crystalline lenses as one ages. Presbyopia can be partially compensated by wearing "reading" glasses that correct near-vision refraction errors so that the eye does not have to focus as strongly when gazing at near objects. Presbyopic persons need different optical corrections for near-vision and sometimes even for distance-vision. However, using two glasses and changing them with great frequency is distracting. To avoid continually exchanging eyeglasses, bifocal spectacles may be used that offer different optical corrections for near-vision and for distance-vision. In some bifocals, the transition between these two vision regions can be abrupt, with a visible line separating the two vision regions. In others, so-called Progressive Addition Lenses (PALs) the transition between the vision regions is gradual and there are no lines or edges visible between the regions with different dioptric powers. Such PAL lenses offer a widely appreciated medical solution for the challenge of presbyopia and are sold in the millions per year in the US.

Other vision-related ailments have received much less attention over the years. One of these discomforts is related to a shift of habits in the modern, digital lifestyle. A large and increasing fraction of professions require workers to spend a large and increasing fraction of their working time focusing at close-distance digital interfaces, including computer screens and mobile devices. The same is true for the private lives of millions, who choose to spend more and more time playing video games, texting and checking updates on cell phones, and watching streaming videos on mobile platforms. All these professional and behavioral shifts rapidly increased the time people spend looking at digital screens, devices, displays, and monitors at a much closer distance than before. The increased time when the eye is trained at near-vision targets places excessive demands on the muscles involved in near-vision. The excessive demands often strain the eyes beyond the comfort zone and tire them out. This can lead to fatigue, discomfort, pain, and digitally induced migraines. Up to now, there is no widely accepted consensus on the precise causation mechanism of these digital-device-related visual discomforts, pains and migraines. Some theories link them to the fast refresh rates of the digital monitors. Others argue that the blue light component of the monitors and displays is an important driver of these problems. Yet others that the symptoms are muscular in their origin, as outlined above. Therefore, there is a need for a well-established medical understanding of the cause of digital eye strain, and for glasses that can provide relief for these digital eye discomforts based on the medical understanding. One of the points of added interest is to combine the above-described progressive addition lenses and emerging digital eyestrain solutions.

SUMMARY

In some embodiments, a contour prism lens, having a position dependent optical power and a position dependent horizontal prism, and having a distance-vision reference point and a near-vision reference point, the contour prism lens being characterized by a coordinate system with its vertical axis running through the distance-vision reference point, can be described as follows. The optical power at the near-vision reference point exceeds the optical power at the distance-vision reference point by less than 0.5 diopter; the horizontal prism on the vertical axis at a vertical coordinate of the near-vision reference point differs from the horizontal prism at the distance-vision reference point by more than 0.2 prism diopter base-in; and the optical power along a horizontal crosscut of the contour prism lens through the near-vision reference point has a power plateau, where the optical power remains within a 0.1 diopter wide range throughout a horizontal region at least 5 mm wide, comprising the near-vision reference point.

In some embodiments, a contour prism lens, having a position dependent optical power and a position dependent horizontal prism, and having a distance-vision reference point and a near-vision reference point, the contour prism lens being characterized by a coordinate system with its vertical axis running through the distance-vision reference point, can be described as follows. The optical power at the near-vision reference point exceeds the optical power at the distance-vision reference point by less than 0.5 diopter; the horizontal prism on the vertical axis at a vertical coordinate of the near-vision reference point differs from the horizontal prism at the distance-vision reference point by more than 0.2 prism diopter base-in; and a horizontal derivate of the optical power along a horizontal crosscut of the contour prism lens through the near-vision point has a minimum within 5 mm from the near-vision reference point.

In some embodiments, a contour prism lens, having a position dependent optical power and a position dependent horizontal prism, and having a distance-vision reference point and a near-vision reference point, the contour prism lens being characterized by a coordinate system with its vertical axis running through the distance-vision reference point, can be described as follows. The optical power at the near-vision reference point exceeds the optical power at the distance-vision reference point by less than 0.5 diopter; the horizontal prism on the vertical axis at a vertical coordinate of the near-vision reference point differs from the horizontal prism at the distance-vision reference point by more than 0.2 prism diopter base-in; and a horizontal derivate of the horizontal prism of the contour prism lens along the horizontal crosscut through the near-vision reference point is between 0 and −0.02 diopters/mm in a 10 mm region comprising the near vision reference point.

In some embodiments, a contour prism progressive lens, having a position dependent optical power and a position dependent horizontal prism, and having a distance-vision reference point and a near-vision reference point, the contour prism progressive lens being characterized by a coordinate system with its vertical axis running through the distance-vision reference point, can be described as follows. The optical power at the near-vision power reference point exceeds the optical power at the distance-vision reference point by a value between 0.25 diopter and 1.0 diopter; the horizontal prism on the vertical axis at a vertical coordinate of the near-vision reference point differs from the horizontal prism at the distance-vision reference point by more than 0.2 prism diopter base-in; and the optical power along a horizontal crosscut of the contour prism progressive lens through the near-vision reference point has a broad maximum where the region where the optical power is at least 85% of its peak is at least 5 mm wide.

In some embodiments, a contour prism progressive lens, having a position dependent optical power and a position dependent horizontal prism, and having a distance-vision reference point and a near-vision reference point, the contour prism progressive lens being characterized by a coordinate system with its vertical axis running through the distance-vision reference point, can be described as follows. The optical power at the near-vision power reference point exceeds the optical power at the distance-vision reference point by a value between 1.0 diopter and 2.5 diopter; the horizontal prism on the vertical axis at a vertical coordinate of the near-vision reference point differs from the horizontal prism at the distance-vision reference point by more than 0.2 prism diopter base-in; and the optical power along a horizontal crosscut of the contour prism progressive lens through the near-vision reference point has a broad maximum where the region where the optical power is at least 85% of its peak value is at least 8 mm wide.

DETAILED DESCRIPTION

A school of thought links eye discomforts and eye strain to the extraocular muscles that rotate the eyes inward to view near objects tiring out over time. According to this school, eye strain can be mitigated by prescribing eyeglasses with base-in prisms. In particular, U.S. Pat. No. 7,104,647 to Krall describes multifocal ophthalmic lenses with such base in prisms. U.S. Pat. Nos. 8,042,940 and 8,287,124 to Krall et al. describe ophthalmic lenses having reduced base out prisms. Finally, U.S. Pat. No. 10,048,512 to Krall et al. describes low convergence spectacles with corresponding embodiments. Among others, these patents describe adding a base-in prism to the spectacle lenses in the near vision region to partially refract the light coming from nearby objects towards the eye's optical center, so that the eyes need to rotate less inward when looking at near objects. Eyeglasses fabricated with various implementations of such "contour prisms" brought relief from eye strains and migraines to tens of thousands of people already. However, there are still ways to improve the design of these lenses to make the medical benefits even more profound. Such improved lens embodiments and designs are described in this document.

Figure 1:
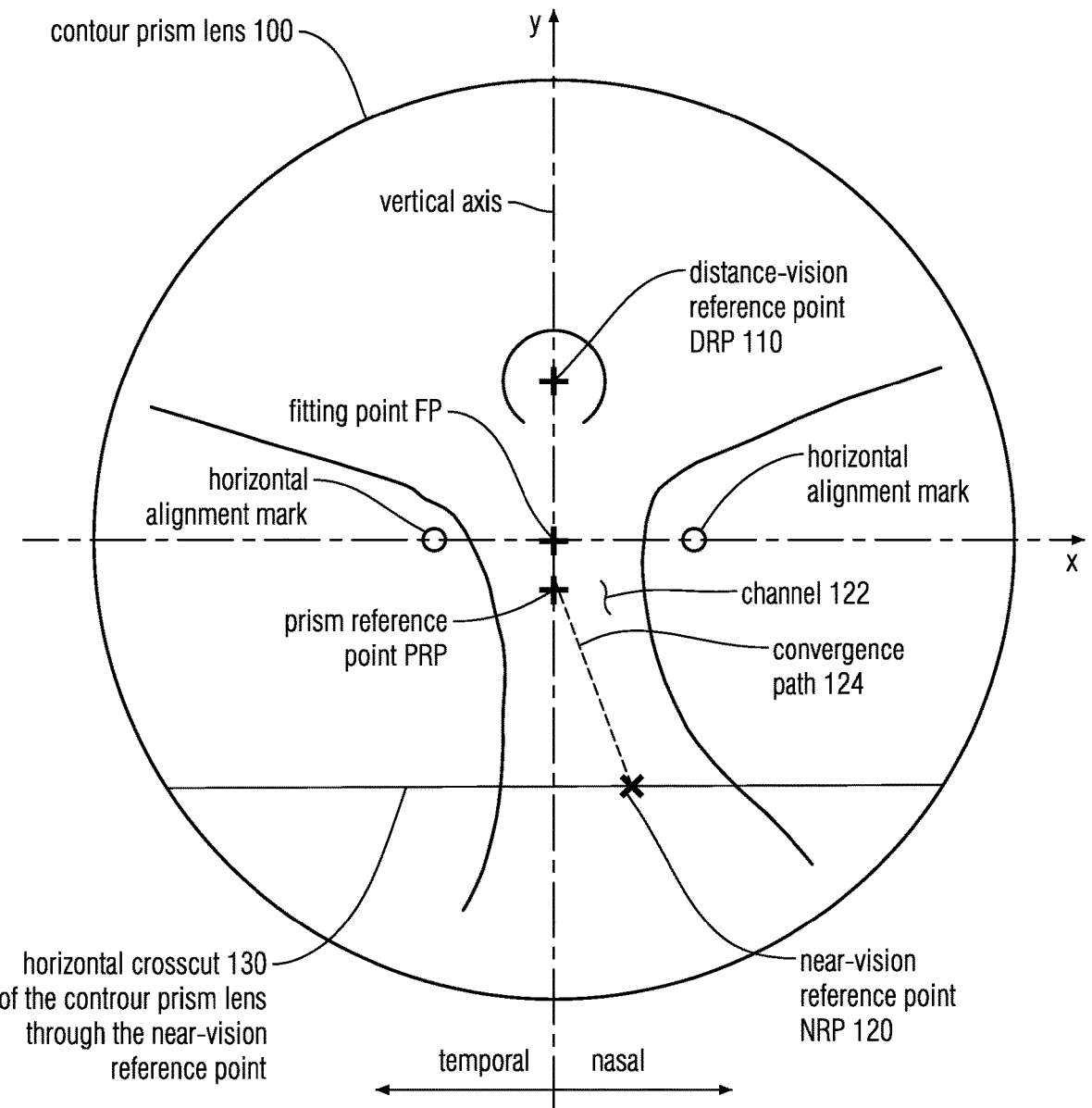
FIG. 1 illustrates conventions and reference points of lens marking.

FIG. 1 shows a contour prism lens 100 and establish the reference frame, lens design reference points and conventions to enable a clear description of the lens designs. Lenses in general are described in a circular form, prior to fitting them into one of the wide variety of available frames. The lenses in general, and a contour prism lens 100 in particular, are described by a coordinate system. This coordinate system has a vertical, or y axis, and a horizontal, or x axis. The vertical/y axis is running through a distance-vision reference point (DRP) 110, which is in a distance-vision region. It also runs through a fitting point (FP) that is typically 6 mm below the DRP 110, often chosen to be the intersection of the vertical and the horizontal axis and serves as the origin, or center, of the x-y coordinate system. Another 2-4 mm further down is a prism reference point (PRP). FIG. 1 shows that often there are two horizontal alignment marks on either side of the vertical axis, typically aligned with the fitting point FP. The marking and design of some glasses may follow somewhat different conventions.

Further down is the near reference point NRP 120 in a near-vision region which is about 15-18 mm below the fitting point FP, and often nasally inset by about 2 mm. The position of these reference points can vary by a couple millimeters from convention to convention, from manufacturer to manufacturer, and from optical society to optical society. So, e.g., in some lenses the near-vision reference point NRP 120 can be 16 mm down from the fitting point FP and inset by 2 mm, in others, 18 mm down and inset by 3 mm. Some lens manufacturers allow some latitude to the ordering optometrist in defining the location of some of these reference points. The fact that the NRP 120 is always nasally inset from the vertical axis can be used for a useful descriptive convention: to name the direction of the horizontal x axis on the side of the NRP "nasal" (closer to the nose), while the opposite side "temporal", to express the direction of the x axis relative to the nose and the temple of the wearing patient.

The above marking and referencing conventions are used, among others, in progressive addition lenses (PALs), where the optical power at the near-vision reference point NRP 120 is 0.25-2.5 diopters stronger than at the distance-vision reference point DRP 110, in order to alleviate the patient's presbyopia. In such progressive lenses the optical power is progressively/gradually increasing from the DRP 110 to the NRP 120. This progressive power increase can be achieved smoothly only in a narrow region called a channel 122, shown in FIG. 1. The center of this channel 122 is approximately defined by a convergence path 124, the path most often followed by the eye when switching between looking through the DRP 110 and looking through the NRP 120. The PAL lenses are designed to deliver high visual acuity with minimal distortions inside this channel 122, but outside the channel 122 the visual acuity decreases, and the distortions increase.

Similar conventions and reference points are also used for "single vision" lenses, where the optical power at the NRP 120 is approximately the same as at the DRP 110, or at least it is within 0.5 diopters.

Single Vision Contour Prism Lenses

Figure 2A:
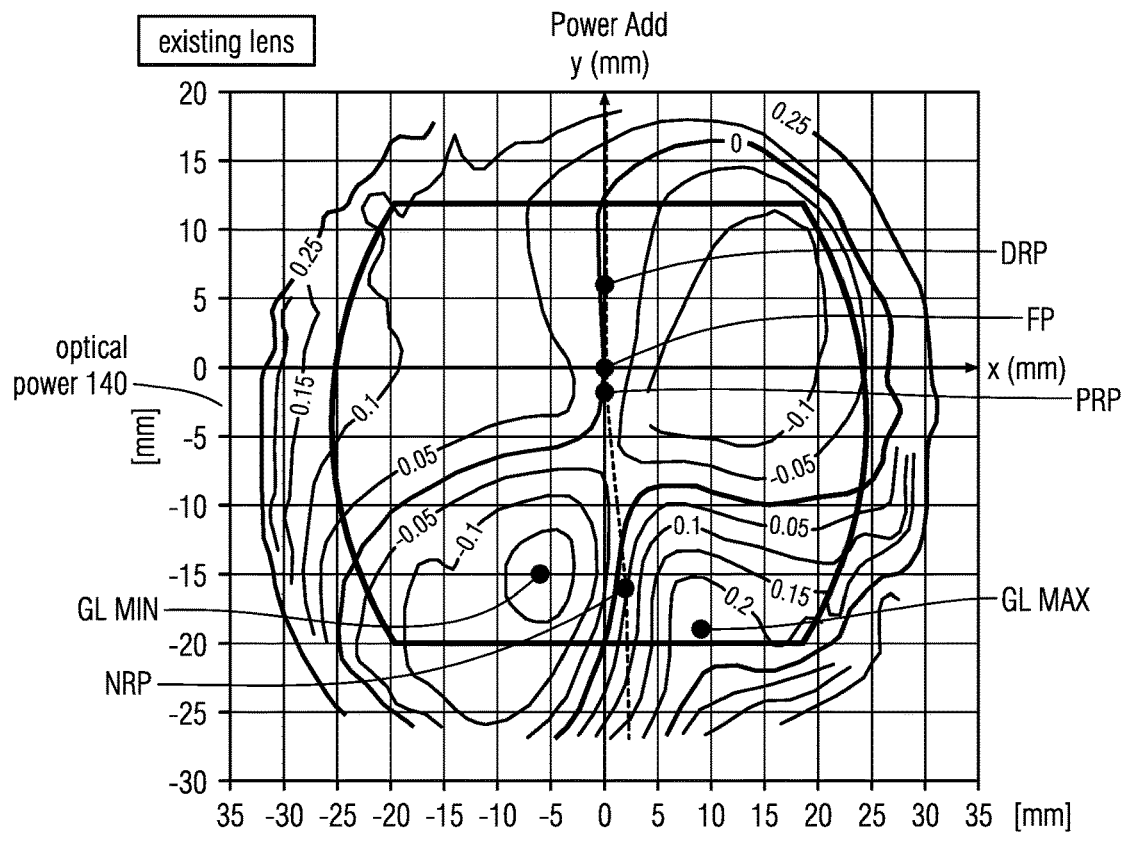
FIGS. 2A-D illustrate power maps and horizontal and vertical cross sections of optical power, horizontal prism and cylinder for contour prism lenses.
Figure 2A:
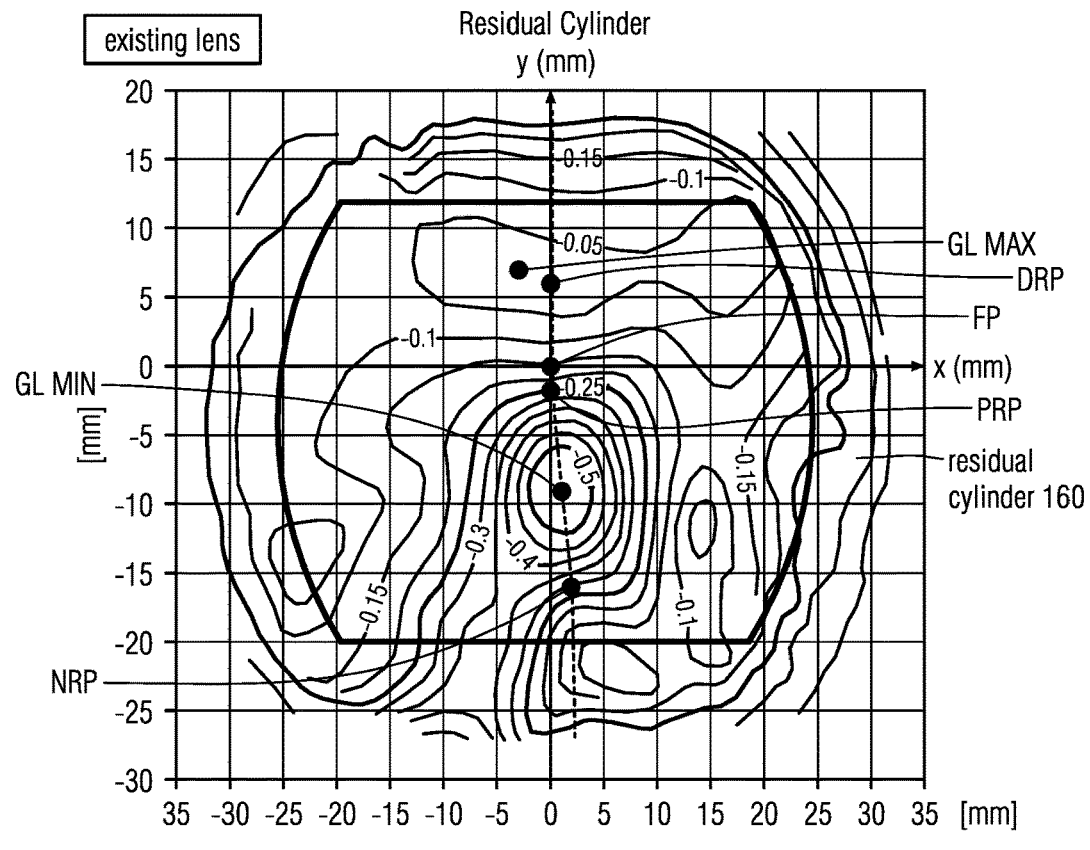
Figure 2A:
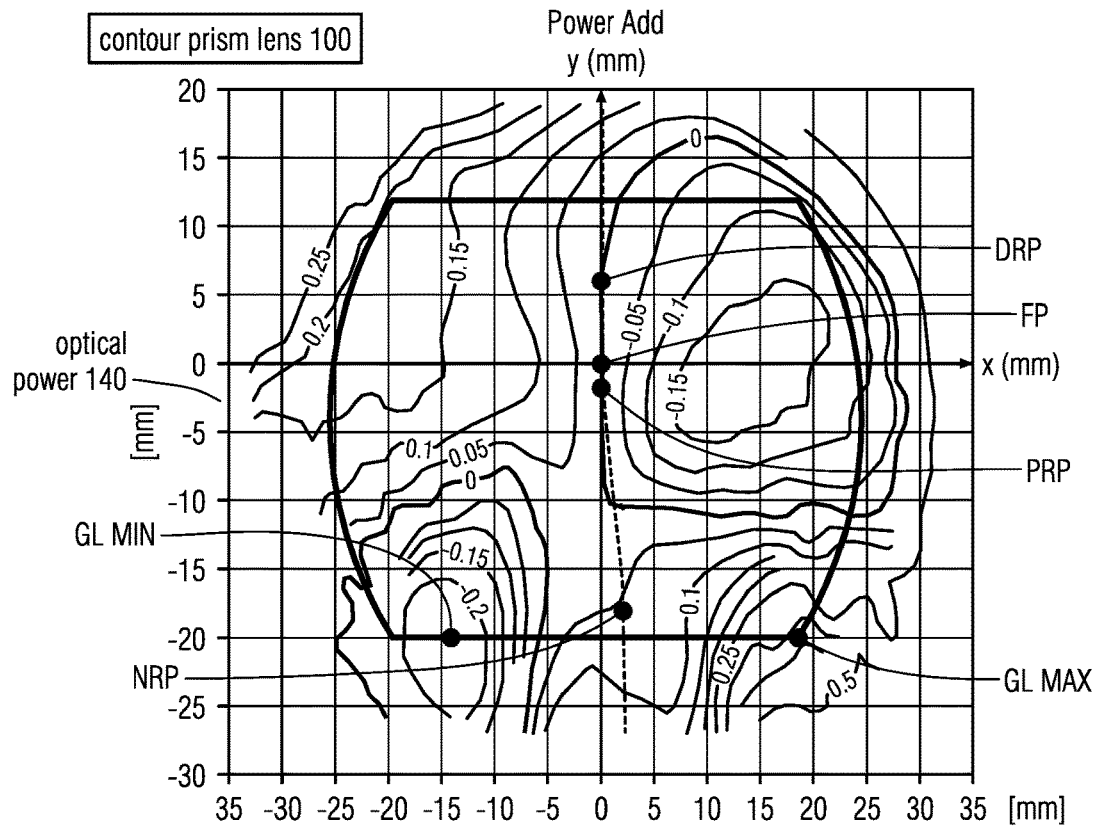
Figure 2A:
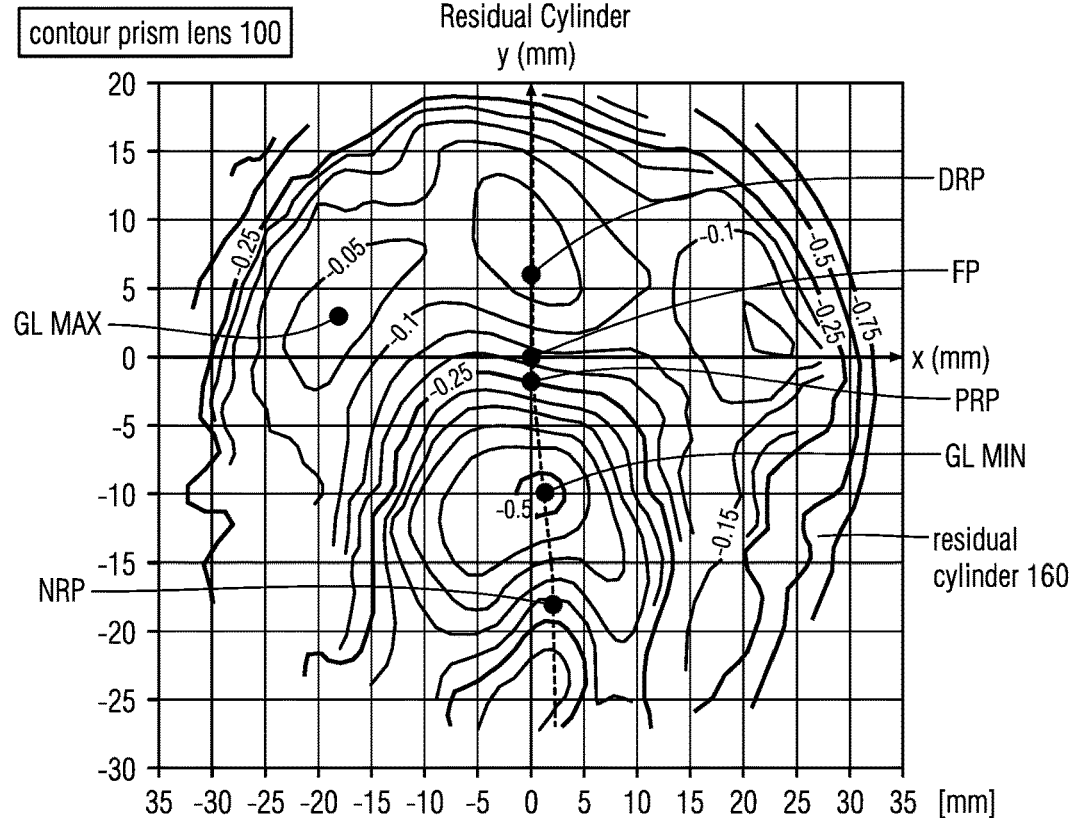

FIG. 2A, top panels show that contour prism lenses have a position dependent optical power 140 (left panel), a position dependent horizontal prism 150 (not shown) and position dependent residual cylinder 160, or simply cylinder 160 (right panel). The position dependence of these optical parameters in general is quite complex and thus their visualization is demanding. FIG. 2A shows these position dependent optical parameters with a two-dimensional power map, where the iso-power points (points with the same optical power 140) are connected with lines, just like elevation maps of mountainous terrains. These two-dimensional power maps also show the DRP 110, FP, PRP, and NRP 120 in the top left panel once. To avoid clutter, in later panels only the NRP 120 is shown and only with its abbreviation, "NRP". Finally, the global maximum and the global minimum of the plotted optical parameter is indicated with GL MAX and GL MIN, respectively. E.g. GL MAX in FIG. 2A left panels show the global maximum of the optical power over the entire power map.

FIG. 2A bottom panels show power maps of embodiments of a contour prism lens 100. To articulate the differences between existing lenses and embodiments of a contour prism lens 100 in a manner simpler than these two-dimensional maps, in what follows, one dimensional crosscuts, or cross sections of these maps will be used. In particular, a horizontal crosscut 130 of the contour prism lens 100 through the near-vision reference point 120 will be used to characterize the position dependent optical power 140, horizontal prism 150, and cylinder 160, as illustrated in FIG. 1.

Next, we clarify some conventions. At every location in the x-y plane, lenses can be characterized by a radius of curvature in two planes, typically both containing the z axis. In some cases, one of the planes is a "vertical" plane that lies in the y-z plane, and the other is a "horizontal" plane that lies in the x-z plane, and the two planes intersect at 90 degrees. In some cases, the two planes may remain forming 90 degrees, but not necessarily aligned with the x and y axes. In yet other embodiments, the two planes are the principal curvature planes of the lens surface, defined by differential geometry, which do not necessarily even make right angles. The lens surface has radii of curvature R1 and R2 in these planes. The sphere power SP is given by the sum of the inverse curvatures: $SP=(n-1)*(1/|R1|+1/|R2|)$, where n is the relative index of refraction of the lens material, and $|Ri|$ are the absolute values of the radii of curvature in the two planes. In simple eyeglasses, R1 is approximately equal to R2 over a large portion of the lens. However, some patients have oblong or prolate eyeballs, which may have uneven radii of curvatures in their principal planes. This condition leads to optical distortions. The visual acuity of such eyeballs can be improved by compensating this distortion with lenses that have uneven radii or curvatures themselves. These lenses are often referred to as having a toricity, or cylinder, defined as $CYL=(n-1)*(1/|R1|-1/|R2|)$, an orientation-dependent quantity. Finally, the optical power OP is traditionally defined as the sphere power plus half of the cylinder: $OP=SP+CYL/2$. This optical power is sometimes also referred to as "spherical equivalent". The optical power 140 in this document follows this convention.

Figure 2B:
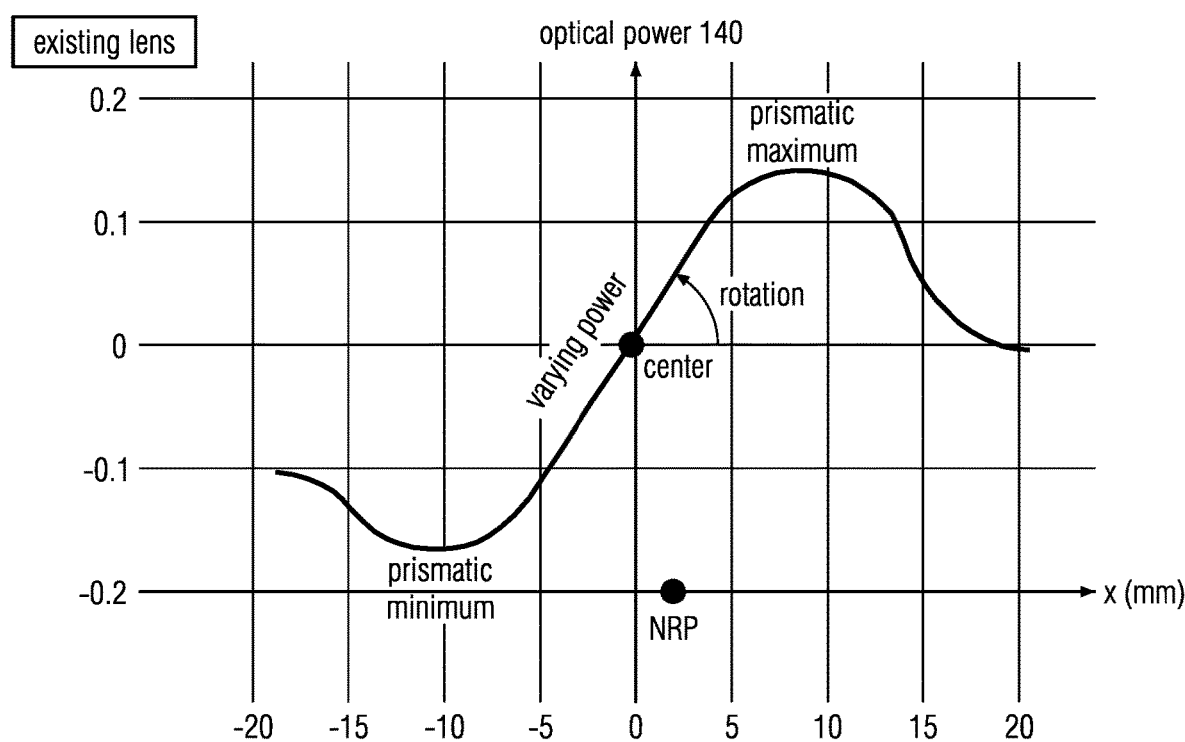
Figure 2B:
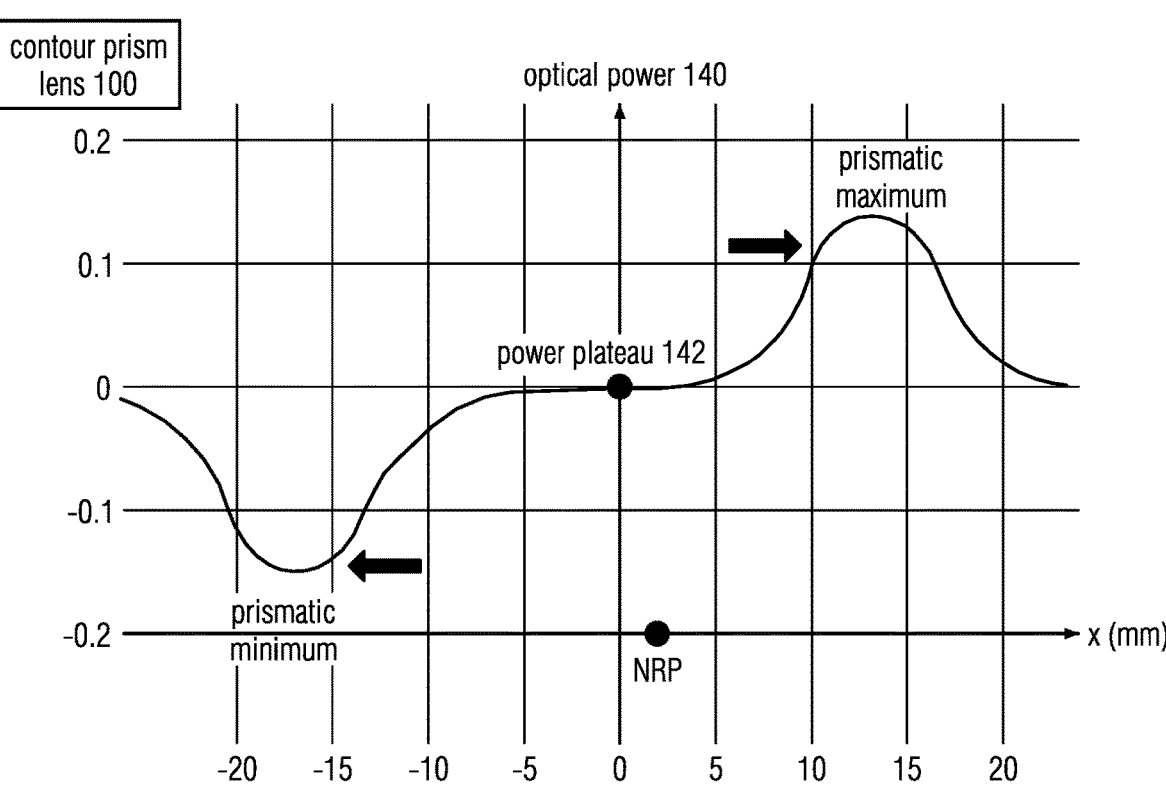

FIG. 2B, top panel shows a design challenge of some existing contour prism lenses on a conceptual level. FIG. 2B top panel shows the optical power 140 along the horizontal crosscut 130 across the NRP 120 of existing contour prism lenses, parametrized with their x coordinate along this crosscut 130. One way to add the aforementioned horizontal base-in prism around the NRP 120 is to rotate a portion of one of the lens surfaces around a center, as shown, in order to make an angle with the other lens surface, and thus to form a region with a base-in prism. The rotation center is typically close to the NRP 120, often even coinciding with it. Now, the two ends of the rotated portion of the surface have to reconnect with the remainder of the lens surface. This reconnecting of the two ends of the rotated surface introduces extra curvatures into the overall lens surface. Because the added prism is base-in, on the nasal side the reconnecting curvature increases the optical power and induces a power maximum. At the temporal side, the reconnecting curvature reduces the optical power and induces a power minimum, as shown. In existing lenses, the power minimum and the power maximum is connected with a monotonous, approximately straight line. This means that the optical power is varying across the NRP 120 as it grows from the temporal minimum to the nasal maximum. Such a variation of the optical power in the most used direction of near-vision, however, can create visual discomfort for the eyes, according to feedbacks from some patients.

FIG. 2B bottom panel illustrates a contour prism 100 lens design that delivers marked improvements in response to this visual discomfort. Broadly speaking, some single vision embodiments of these contour prism lens 100 have an optical power 140 at the near-vision reference point 120 that exceeds the optical power at the distance-vision reference point 110 by less than 0.5 diopter; and they also have a horizontal prism 150 on the vertical axis at a vertical coordinate of the NRP 120 that differs from the horizontal prism 150 at the DRP 110 by more than 0.2 prism diopter base-in, like existing lenses. Lenses with less than 0.2 prism diopter sometimes produce only limited medical benefits for some patients. It is recalled here that rotationally symmetric lenses spontaneously induce a prism off the y axis because their thickness varies from their center towards their edges. This prism-generation is captured in Prentice's rule: $\alpha^x=x*D$, where $\alpha^x$ is the horizontal/x directional induced prism angle, x is the horizontal distance from the y axis, and D is the optical power 140 in diopters. Therefore, the prismatic nature of the contour prism lenses 100 is best captured by describing the prism on the vertical, or y, axis, where $\alpha^x$, the spontaneously induced prism according to Prentice's rule vanishes.

In some embodiments, the contour prism lens 100 can have an optical power 140 at the near-vision reference point 120 that exceeds the optical power at the distance-vision reference point 110 by only less than 0.2 diopter. Such lenses, where the optical power at the DRP 110 and the NRP 120 are within a few tenth of a diopter from each other, often equaling each other, can be called single vision lenses, at least in an approximate sense.

The bottom panel of FIG. 2B illustrates conceptually that the contour prism lenses 100 mitigate the power varying across the NRP 120 of the existing lenses with the formation of a "power plateau" 142 in their optical power 140 around the NRP 120: a central region where the optical power 140 varies very little or not at all along the horizontal crosscut 130. In some embodiments, the optical power 140 along the horizontal crosscut 130 of the contour prism lens 100 through the near-vision reference point 120 has a power plateau 142 where the optical power 140 remains within a 0.1 diopter wide range throughout a horizontal region at least 5 mm wide, comprising the NRP 120. In some embodiments of the contour prism lenses 100, the width of this horizontal region can be 8 mm, in others, 10 mm.

This power plateau 142 can be achieved by shifting the nasal prismatic maximum farther nasally, and, optionally, the temporal prismatic minimum farther temporally in embodiments of the contour prism lenses 100. Such a lens design reduces, minimizes, or even eliminates the variation of the optical power around the NRP 120, and thus markedly increases the visual comfort for the patients. A further benefit of such designs is that the horizontal prism is also varying more slowly in the power plateau 142 region, which further increases visual comfort.

Figure 2C:
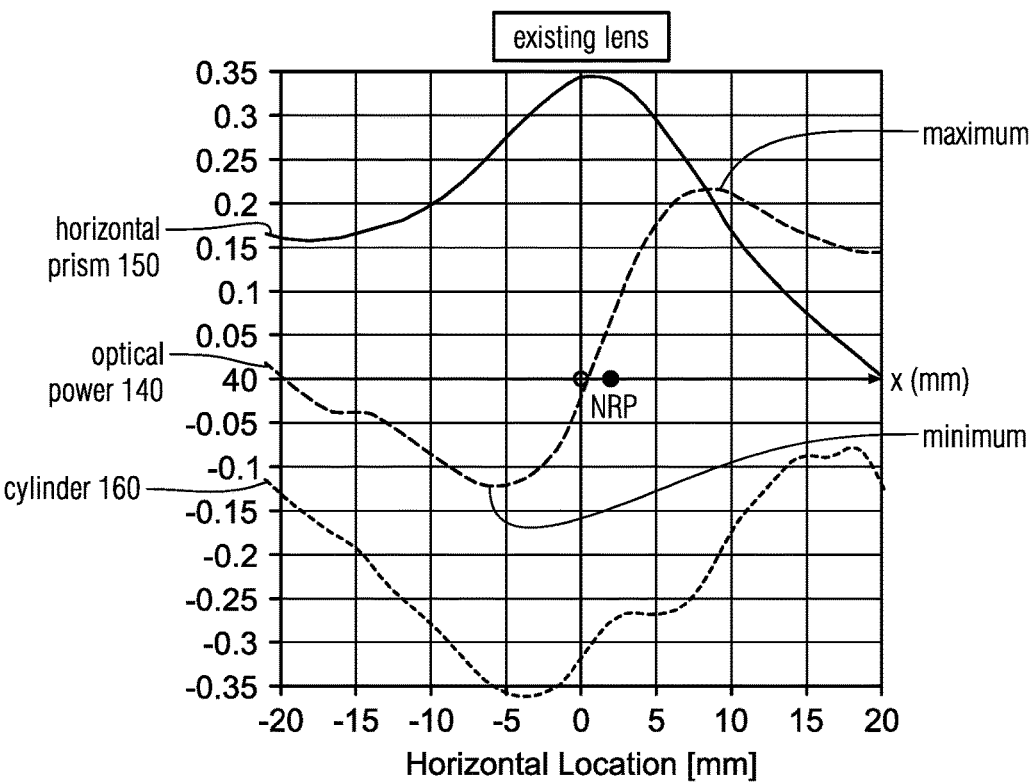
Figure 2C:
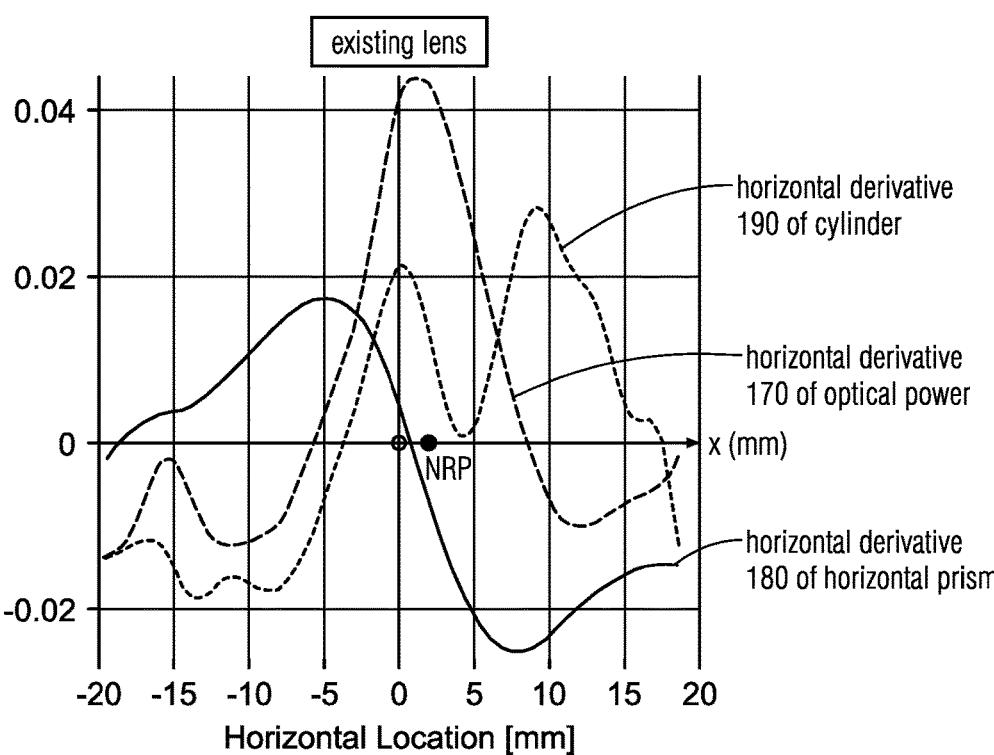
Figure 2C:
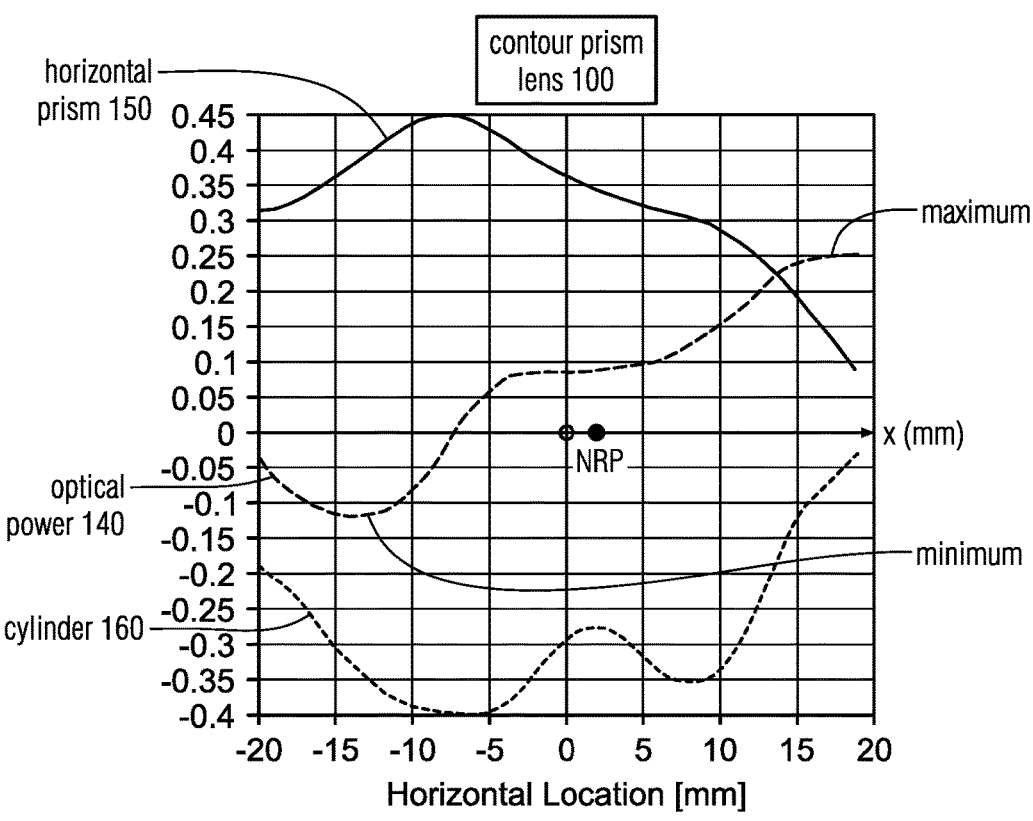
Figure 2C:
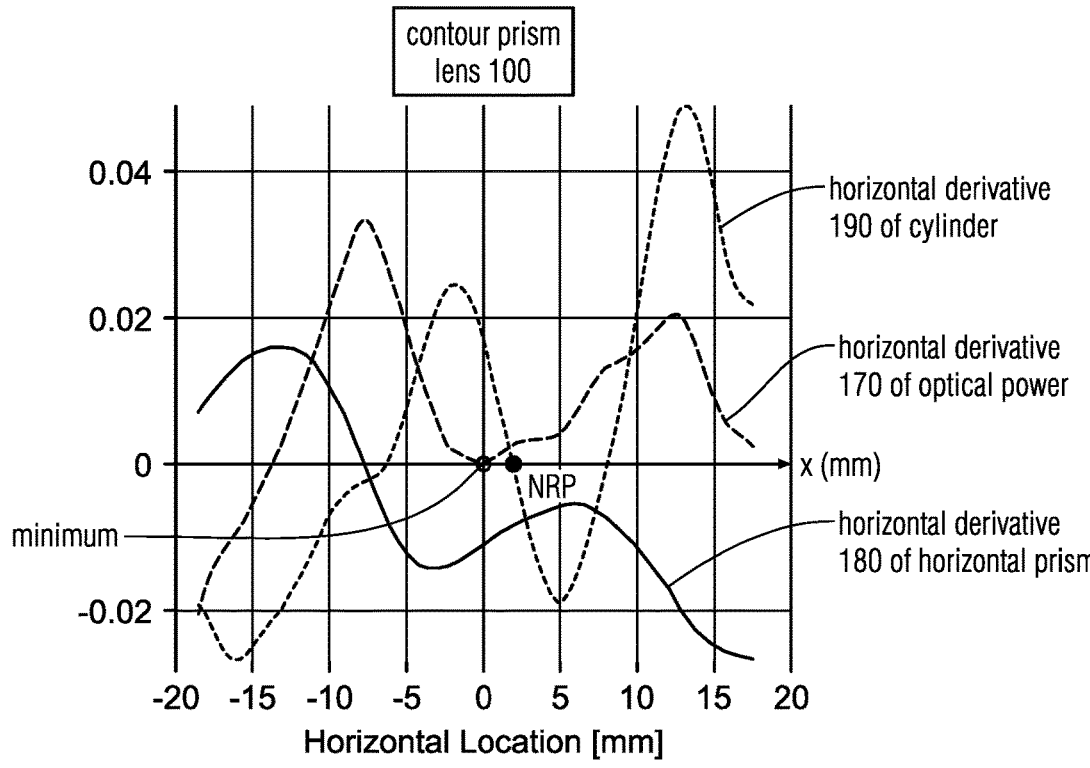

FIG. 2C shows an implementation of the design concept of FIG. 2B. The top panels describe existing lenses, the bottom panels describe embodiments of the contour prism lens 100. In some embodiments of the contour prism lens 100, the optical power 140 along a horizontal crosscut 130 through the near-vision reference point 120 has a minimum more than 10 mm temporal relative to the near-vision reference point 120. In some embodiments of the contour prism lens 100 the optical power 140 along a horizontal crosscut 130 through the near-vision reference point 120 has a maximum more than 10 mm nasal relative to the near-vision reference point 120. In the contour prism lens 100 of FIG. 2C, the distance of the nasal maximum relative to the NRP 120 increased substantially from 8 mm of the existing design (top left panel) to about 18-20 mm (bottom left panel). The distance of the temporal minimum from the NRP 120 increased from 6 mm (top left panel) to about 16 mm (bottom left panel).

Another natural way to capture the slow variation of the optical power 140 of the contour prism lens 100 across the NRP 120 is via showing that its horizontal (x-directional) derivative 170 of the optical power 140 is small, shown in the bottom right panel of FIG. 2C. Embodiments of the contour prism lens 100 can have a horizontal derivate 170 of the optical power 140 along the horizontal crosscut 130 of the contour prism lens 100 through the NRP 120 that has a minimum within 5 mm from the NRP 120. Often, this minimum is temporal relative to the NRP 120. The horizontal derivative 170 of the optical power 140 having a minimum close to the NRP 120 captures well the concept of the power plateau 142, since the horizontal derivative of the optical power at the power plateau 142 of FIG. 2B is approximately zero. In general, at its minimum the horizontal derivate 170 of the optical power 140 can be a small positive value or zero. In some embodiments, it can be a small negative value. The smallness of the horizontal derivative 170 is a natural indicator that the optical power 140 has an approximate power plateau 142. In FIG. 2C, the horizontal derivative 170 of the optical power 140 has a minimum approximately at x=0, 2 mm temporal from the NRP 120, where its value is approximately 0 diopter/mm.

In some other embodiments, this horizontal derivative 170 of the optical power 140 along the horizontal crosscut 130 of the contour prism lens 100 through the NRP 120 is small but non-zero at its minimum. In some embodiments, this horizontal derivative 170 of the optical power 140 is less than 0.02 diopter/mm at its minimum. In some other embodiments, the horizontal derivative 170 of the optical power 140 along the horizontal crosscut 130 of the contour prism lens 100 is less than 0.01 diopter/mm at its minimum.

These horizontal derivative features and values are to be contrasted with the horizontal derivative of existing lenses, which are shown in the top right panel of FIG. 2C not having a minimum in a wide region around to the NRP 120. Minima of the horizontal derivate are only located approximately at x=−12 mm, and at x=+12 mm. In fact, the horizontal derivative 170 of the optical power 140 has a maximum close to the NRP 120, where its value greater than 0.04 diopter/mm, well in excess of the described 0.02 diopter/mm and 0.01 diopter/mm values at the NRP 120 of the contour prism lens 100 in the bottom right panel. The derivative's high value exceeding 0.04 diopter/mm is a quantitative measure of the mentioned fast variation of the optical power across the NRP 120 in existing lenses.

Finally, in some embodiments, the optical power 140 not only exhibits a power plateau 142 and a corresponding horizontal derivative minimum, but this plateau persists over a suitably wide interval, or region. In some embodiments of the contour prism lens 100, a magnitude of the horizontal derivative 170 of the optical power 140 along the horizontal crosscut 130 of the contour prism lens 100 through the NRP 120 is less than 0.02 diopter/mm in a 10 mm wide horizontal region, comprising the NRP 120. In some embodiments, the magnitude of the horizontal derivative 170 in such a 10 mm wide horizontal region can be less than 0.01 diopter/mm. An example is shown in the bottom right panel of FIG. 2C, where the magnitude of the horizontal derivative 170 remains below 0.02 diopter/mm from x=−5 mm temporal to x=+12 mm nasal: a 17 mm wide region; and the magnitude of the horizontal derivative 170 remains below 0.01 diopter/mm from x=−3 mm temporal to x=+7 mm nasal: a 10 mm wide region.

As mentioned in relation to the conceptual FIG. 2B, the "power plateau 142" region around the NRP 120 having a reduced variation of the optical power 140 also reduces the variation of the horizontal prism 150. This effect is well demonstrated in FIG. 2C. The top left panel shows that in existing lenses the horizontal prism 150 varies by a substantial amount around the NRP 120. This includes having a maximum very close to the NRP 120.

In contrast, the bottom left panel of FIG. 2C shows that in embodiments of the contour prism lens 100, the horizontal prism 150 along the horizontal crosscut 130 of the contour prism lens 100 through the near-vision reference point 120 does not have a maximum in the x=+5 mm to x=−5 mm region: it is a slowly and smoothly varying function.

This smooth, slow variation is captured by the bottom right panel of FIG. 2C, which shows that in some embodiments of the contour prism lens 100, the horizontal derivative 180 of the horizontal prism along the horizontal crosscut 130 of the contour prism lens 100 through the near-vision reference point 120 is between 0 and −0.02 diopter/mm in a 10 mm wide horizontal region comprising the near-vision reference point 120. In the example of FIG. 2C, this region extends from x=−8 mm temporal to x=+13 mm nasal, a 21 mm wide region; and its magnitude remains less than 0.02 diopter/mm in the entire shown, 40 mm wide region.

Figure 2D:
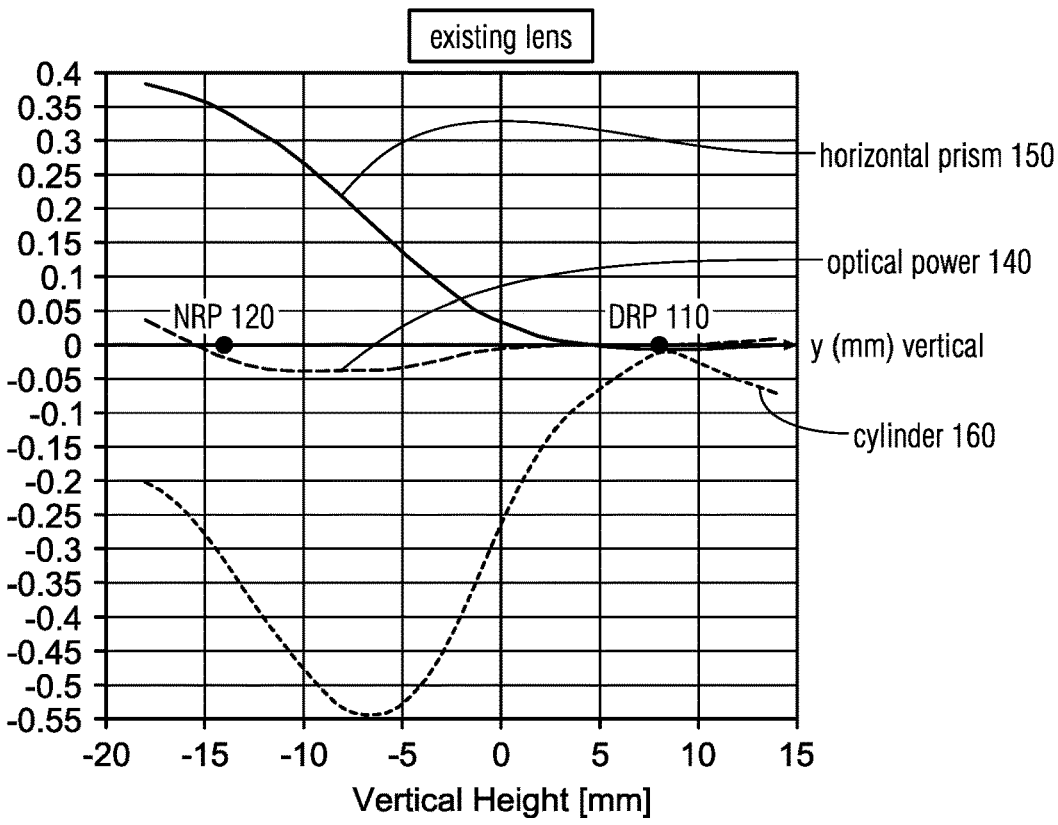
Figure 2D:
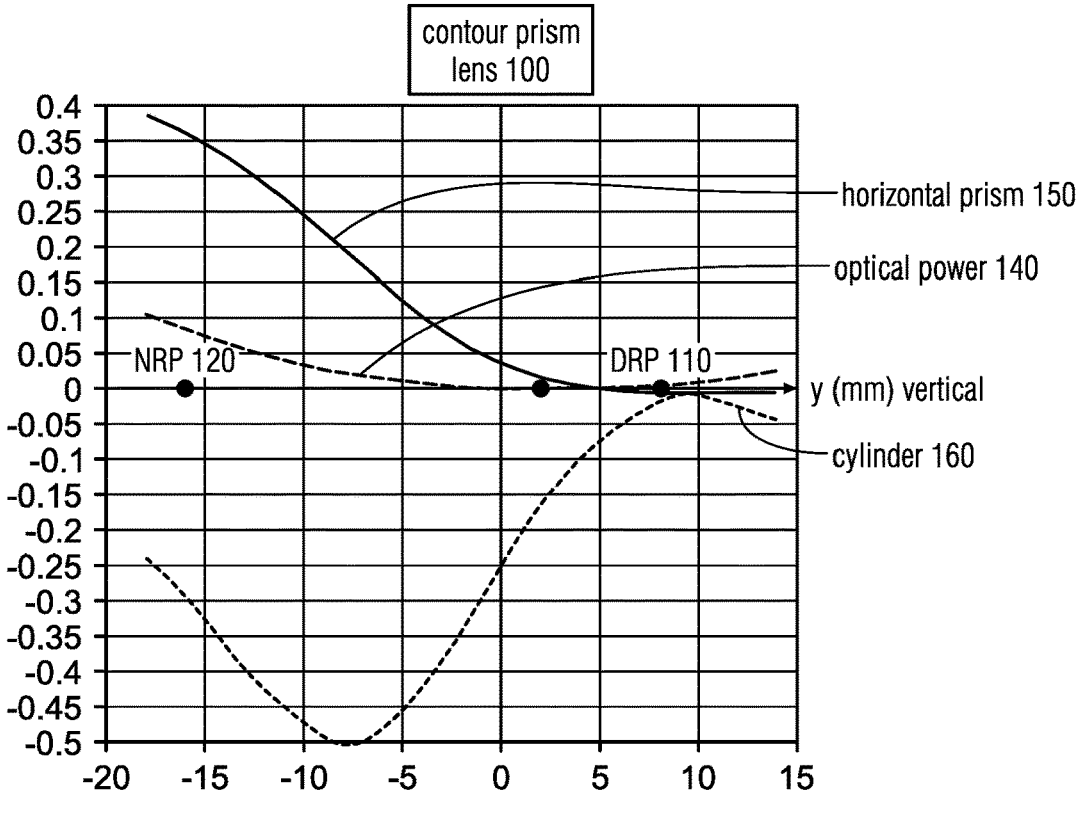

FIG. 2D is provided to make the description of the embodiments of the contour prism lens 100 more comprehensive. The two panels show how the optical power 140, the horizontal prism 150 and the cylinder 160 vary along the vertical cut tracking the y axis. The top panel shows these quantities for existing contour prism lenses, while the bottom panel shows them in embodiments of the contour prism lens 100. Importantly, it shows how the horizontal prism 150 rises from its essentially zero value at the DRP 110 to about 0.35 prism diopter at the y coordinate of the NRP 120, on the y axis. The optical power 140 at the NRP 120 differs from its value at the DRP 110 by a value less than 0.1 diopter in both existing designs (top panel) and in embodiments of the contour prism lens 100 (bottom panel).

FIG. 2C shows that in some embodiments, the contour prism lens 100, the optical power 140 at the near-vision reference point 120 exceeds the optical power 140 at the distance-vision reference point 110 by less than 0.5 diopter; the horizontal prism 150 on the vertical axis at a vertical coordinate of the near-vision reference point 120 differs from the horizontal prism 150 at the distance-vision reference point 110 by more than 0.2 prism diopter base-in; and a horizontal derivate 170 of the optical power 140 along a horizontal crosscut 130 of the contour prism lens 100 through the near-vision point 120 has a minimum within 5 mm from the near-vision reference point 120.

In some embodiments, the optical power 140 along a horizontal crosscut 130 of the contour prism lens 100 through the near-vision reference point 120 has a power plateau 142 where the optical power 140 remains within a 0.1 diopter wide range over a 10 mm wide horizontal region comprising the near-vision reference point 120.

In some embodiments, a magnitude of the horizontal derivate 170 of the optical power 140 along the horizontal crosscut 130 of the contour prism lens 100 through the near-vision reference point 120 is less than 0.02 diopter/mm throughout a 10 mm region comprising the near-vision reference point 120.

FIG. 2C shows that in some embodiments of the contour prism 100, the optical power 140 at the near-vision reference point 120 exceeds the optical power 140 at the distance-vision reference point 110 by less than 0.5 diopter; the horizontal prism 150 on the vertical axis at a vertical coordinate of the near-vision reference point 120 differs from the horizontal prism 150 at the distance-vision reference point 110 by more than 0.2 prism diopter base-in; and a horizontal derivate 180 of the horizontal prism 150 of the contour prism lens 100 along the horizontal crosscut 130 through the near-vision reference point 120 is between 0 and −0.02 diopters/mm in a 10 mm region comprising the near vision reference point 120.

In some embodiments, the optical power 140 along a horizontal crosscut 130 of the contour prism lens 100 through the near-vision reference point 120 has a power plateau 142 where the optical power 140 remains within a 0.1 diopter wide range over a 10 mm wide horizontal region comprising the near-vision reference point 120.

The hitherto described various features of the contour prism lens 100 can be implemented in different combinations in different embodiments.

Contour Prism Lenses with Progressive Power

Figure 3A:
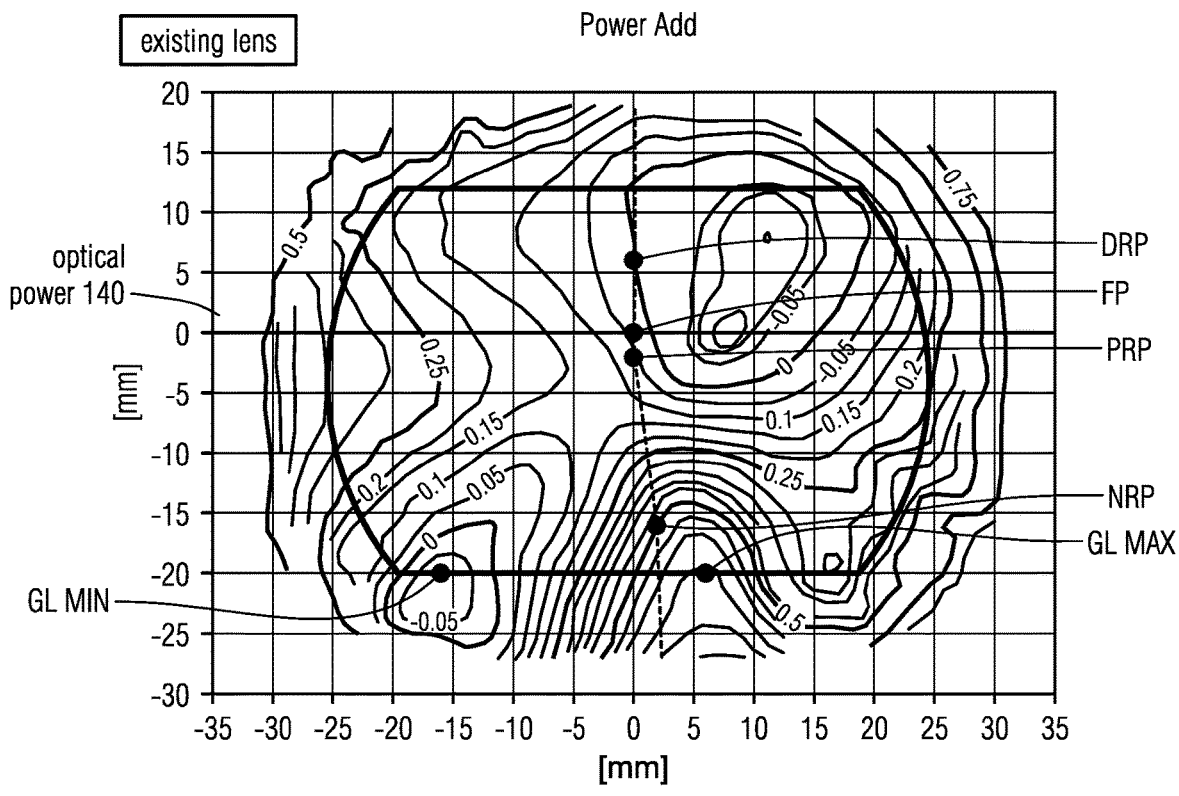
FIGS. 3A-E illustrate power maps and horizontal and vertical cross sections of optical power, horizontal prism and cylinder for contour prism progressive lenses.
Figure 3A:
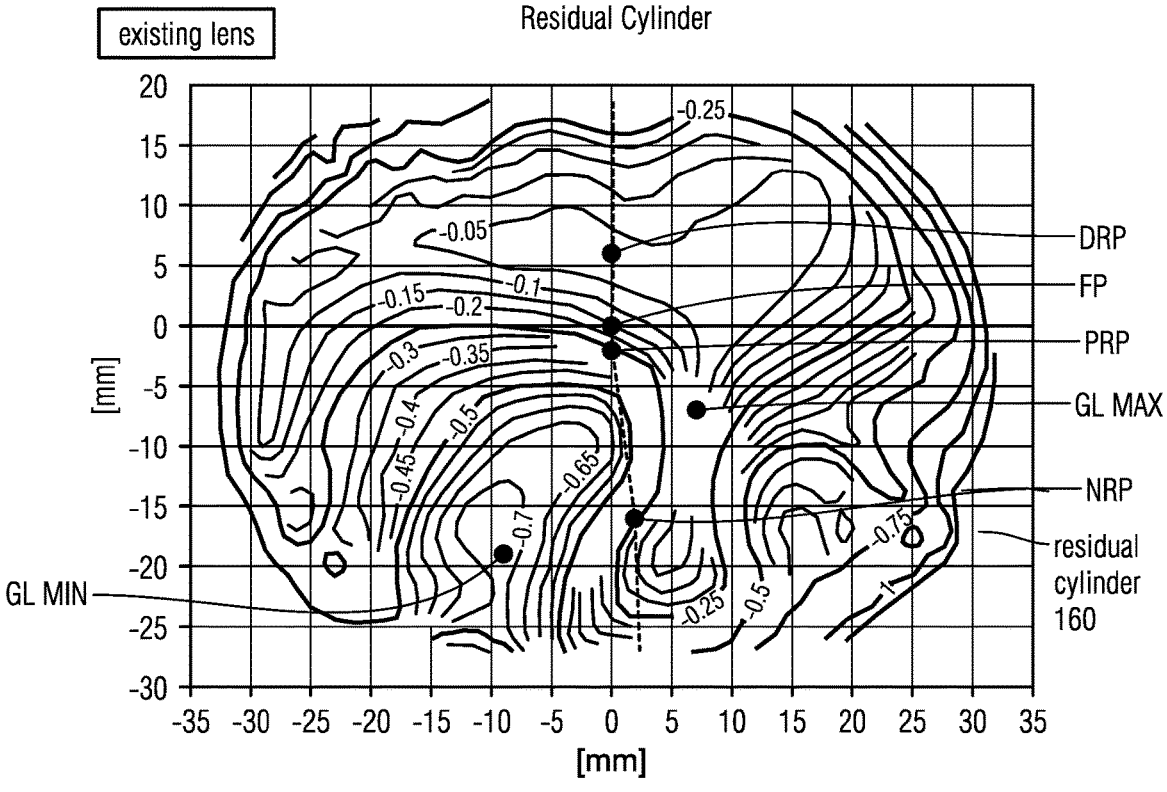
Figure 3A:
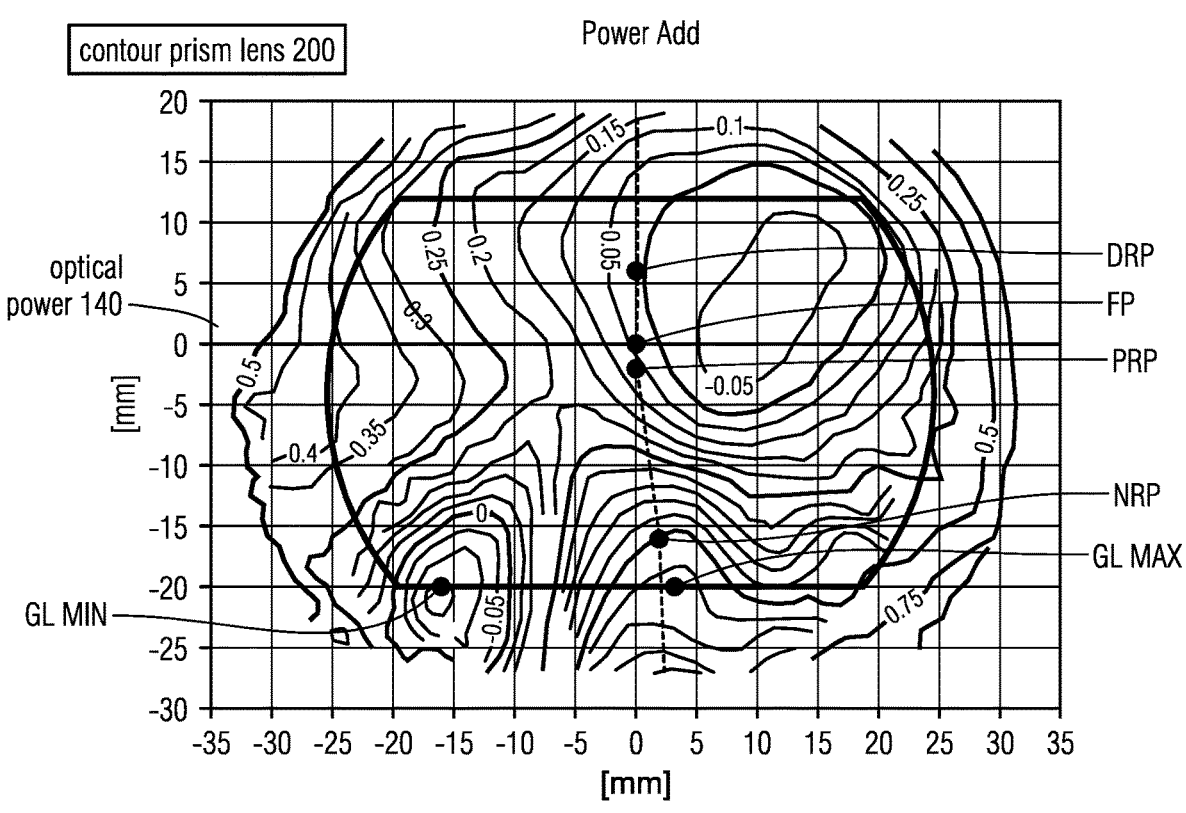
Figure 3A:
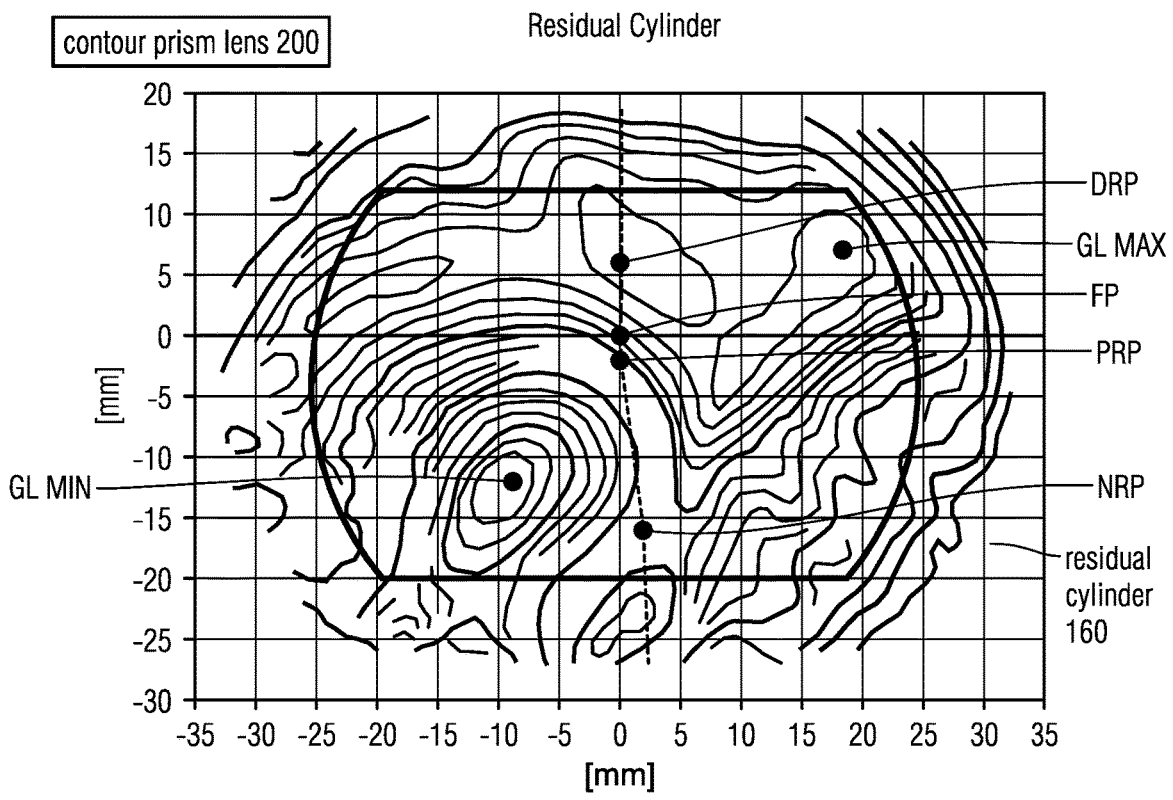

Next, embodiments of the contour prism lens will be described where the above ideas are implemented in a progressive lens. FIG. 3A top panels again describe existing progressive lenses with a contour prism with the help of their two-dimensional optical power maps. The bottom panels describe embodiments of contour prism progressive lenses 200 through their two-dimensional optical power maps which have the power plateau idea implemented in them. As before, while these two-dimensional power maps provide a rich description of the lenses, one-dimensional cross-sectional figures can be helpful to further articulate the differences between the two classes of lenses.

Figure 3B:
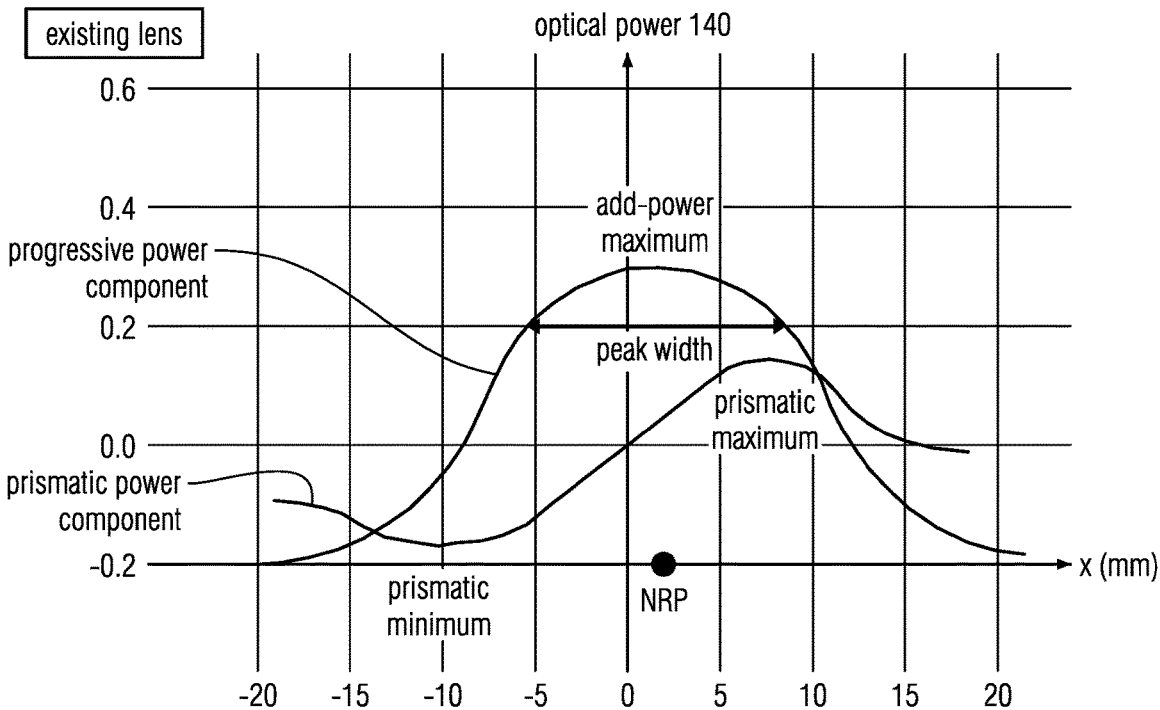
Figure 3B:
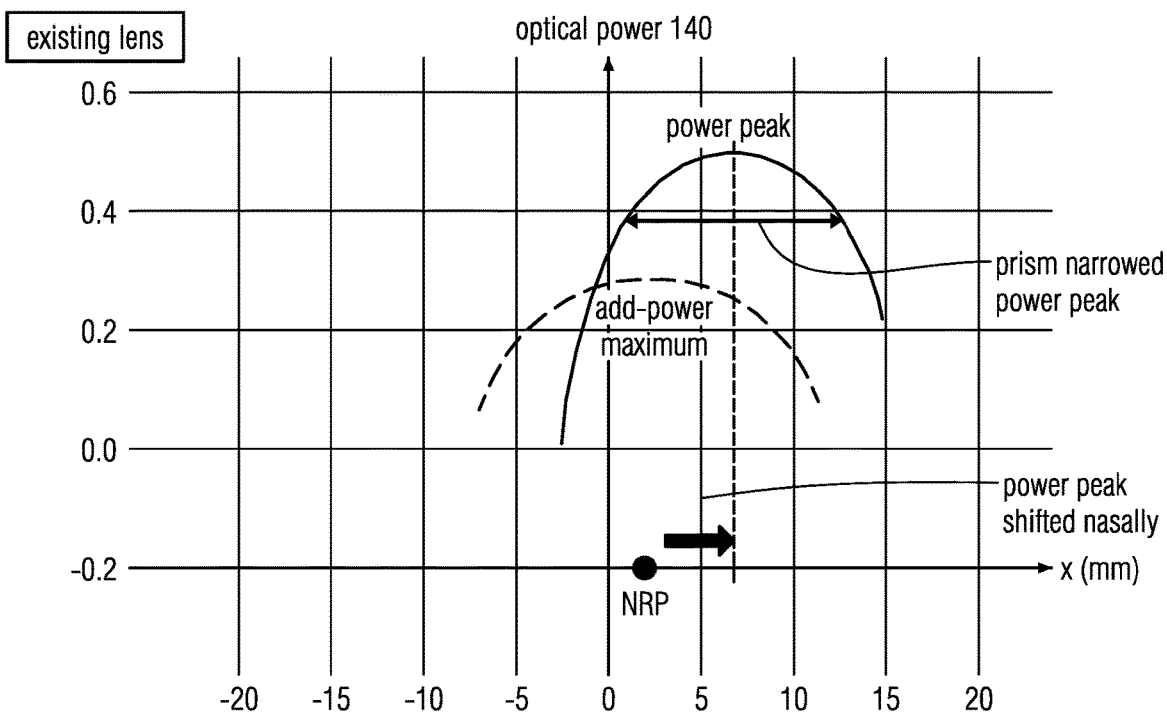
Figure 3B:
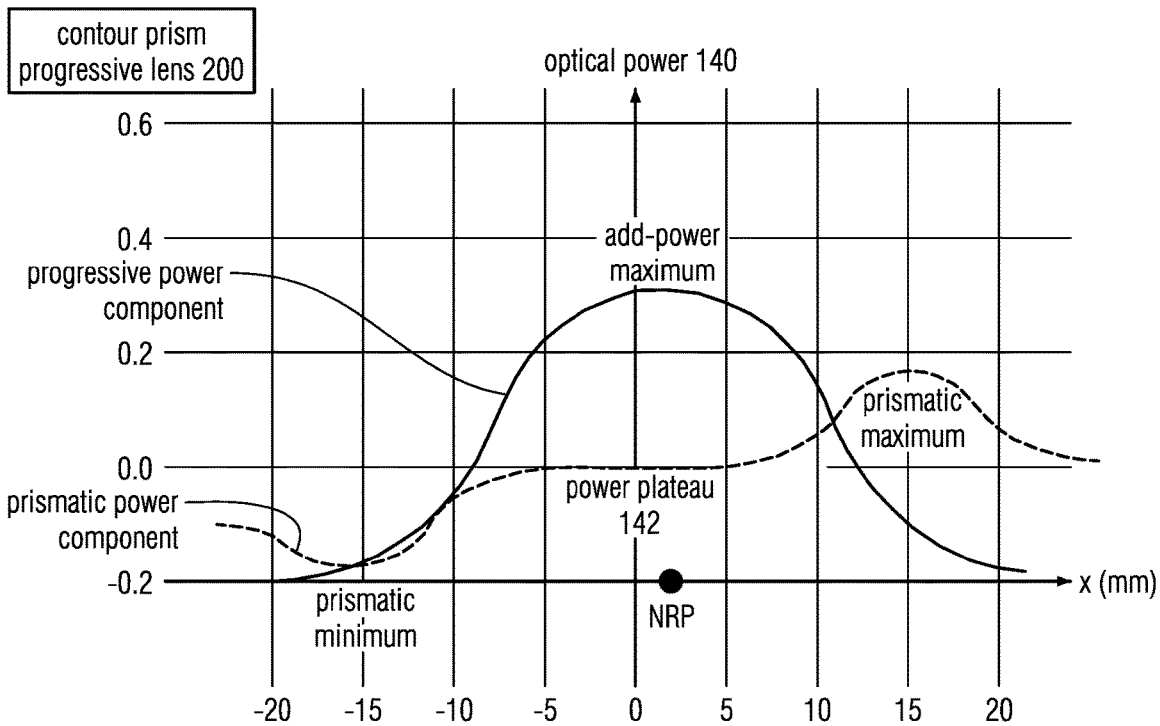
Figure 3B:
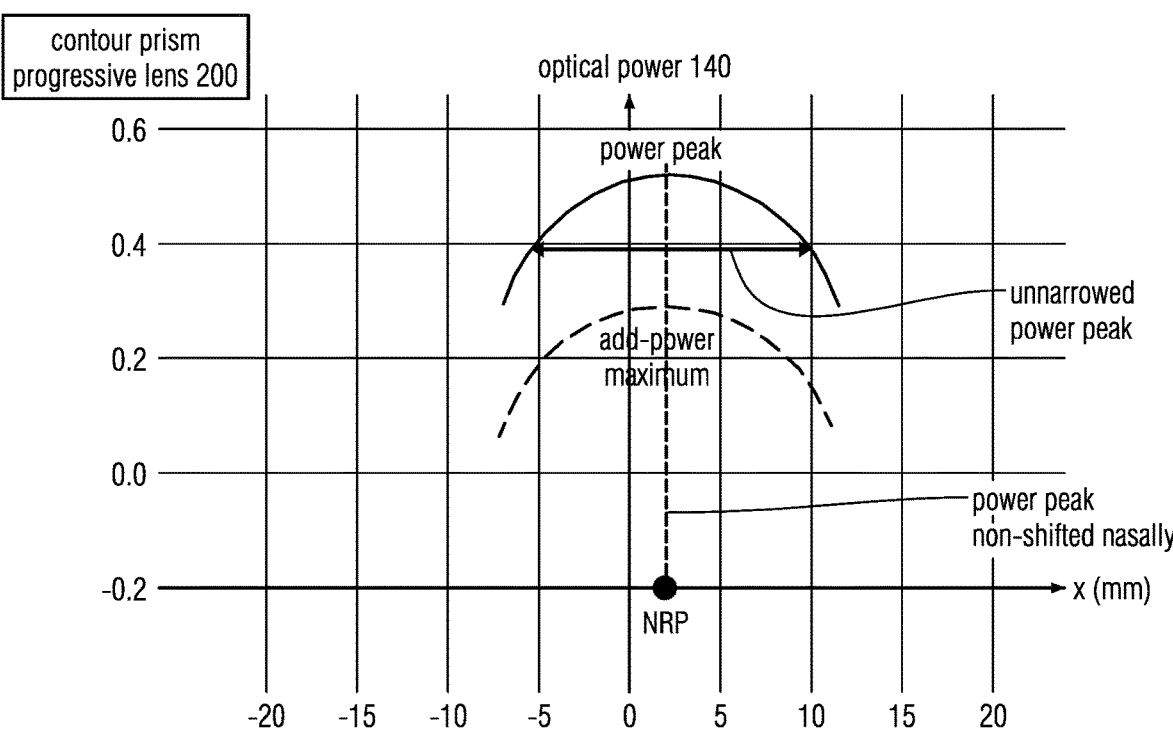

FIG. 3B shows such one-dimensional cross-sections: the optical power 140 along the horizontal crosscut 130 running through the NRP 120. In prismatic progressive lenses the optical power 140 is constructed by summing up two components: the "progressive power component" of the progressive lens design which itself has a maximum at the NRP 120, and the "prismatic power component" with the minimum-maximum power structure of the contour prism. The resulting sum of these two power components will be simply referred to as the optical power 140. The top left panel of FIG. 3B shows these two power components in existing lenses.

The top right panel of FIG. 3B shows two issues where existing lens designs can be improved. First, in existing lenses the power maximum region, or power peak, is shifted nasally relative to the NRP 120, because it is the sum of the progressive power component and the prismatic power component, and since the prismatic maximum of the prismatic power component is nasal relative to the NRP 120, it shifts the maximum of the sum of the two power components nasally as well. This nasal shift is well visible, e.g., in the top left panel of FIG. 3A, where the global maximum of the optical power, indicated by "GL MAX" on the two-dimensional power maps is visibly shifted nasally relative to the NRP 120. Medical feedback indicates that the visual experience of patients is rapidly deteriorating when the maximum of the total optical power is shifted nasally, probably because such a nasal shift forces further nasal rotation of the eyes and thereby further strains the extra-ocular muscles.

Second, the power maximum region, or power peak is narrowed because the prismatic power component has a slope around the maximum of the progressive power component, and therefore tilts the sum of the two components and thus narrows the power maximum. This "prism-narrowed peak" narrows the region of optimal visual acuity, causing a second source of discomfort.

Therefore, modifications of the design of existing progressive lenses are called for to preempt the nasal shift of the power peak and the narrowing of the power peak.

The bottom panels of FIG. 3B show conceptually that the power plateau 142 implementation of the contour prism for single vision lenses, shown in FIG. 2B, also offers improvements in these two areas for progressive lenses. First, since the prismatic power component has a power plateau 142 approximately co-located with the maximum of the progressive power component, the sum of these two power components is not shifted nasally, it is kept approximately at the NRP 120. Second, the same power plateau 142 of the prismatic power component also means that there is no slope in the prismatic power component that would narrow the peak of the sum of the two power components. Therefore, the power peak in power-plateau-based progressive lens designs is also wider than in existing lens designs.

Figure 3C:
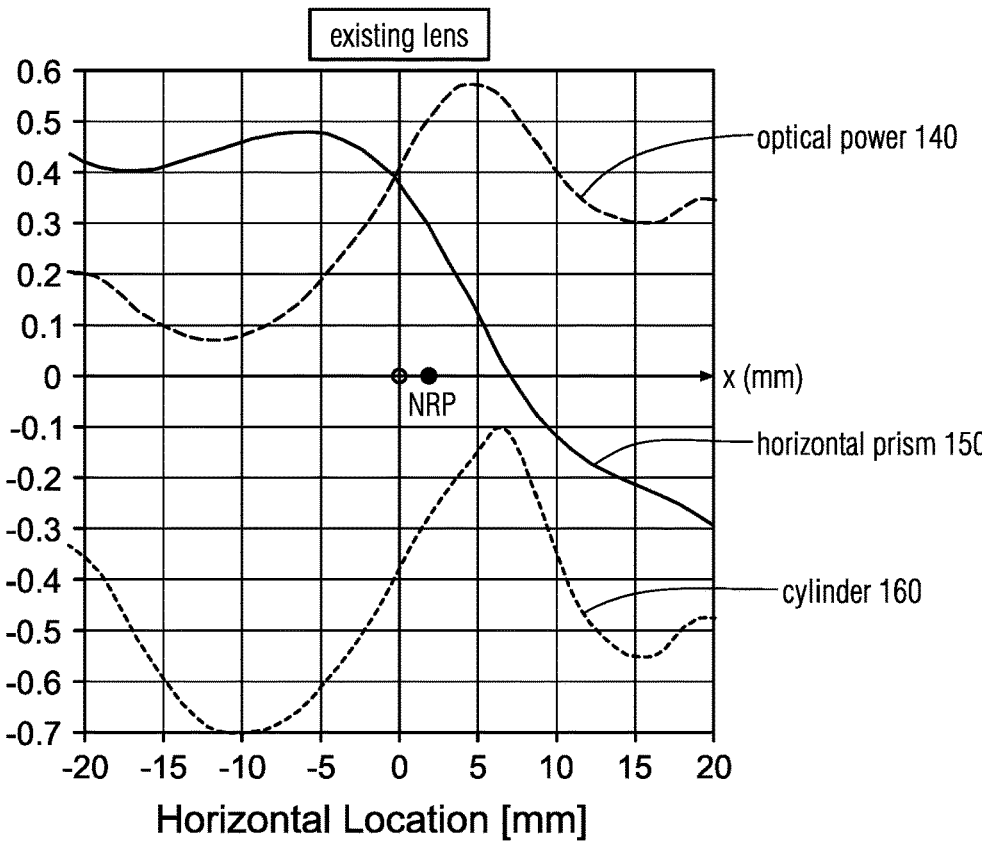
Figure 3C:
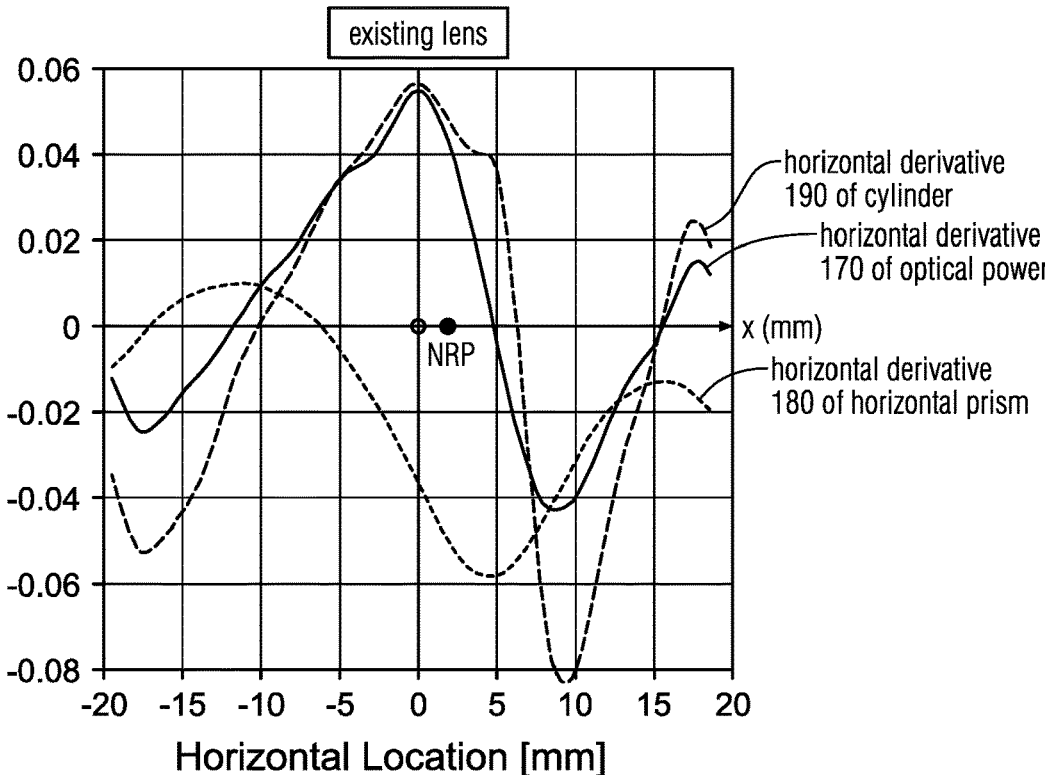
Figure 3C:
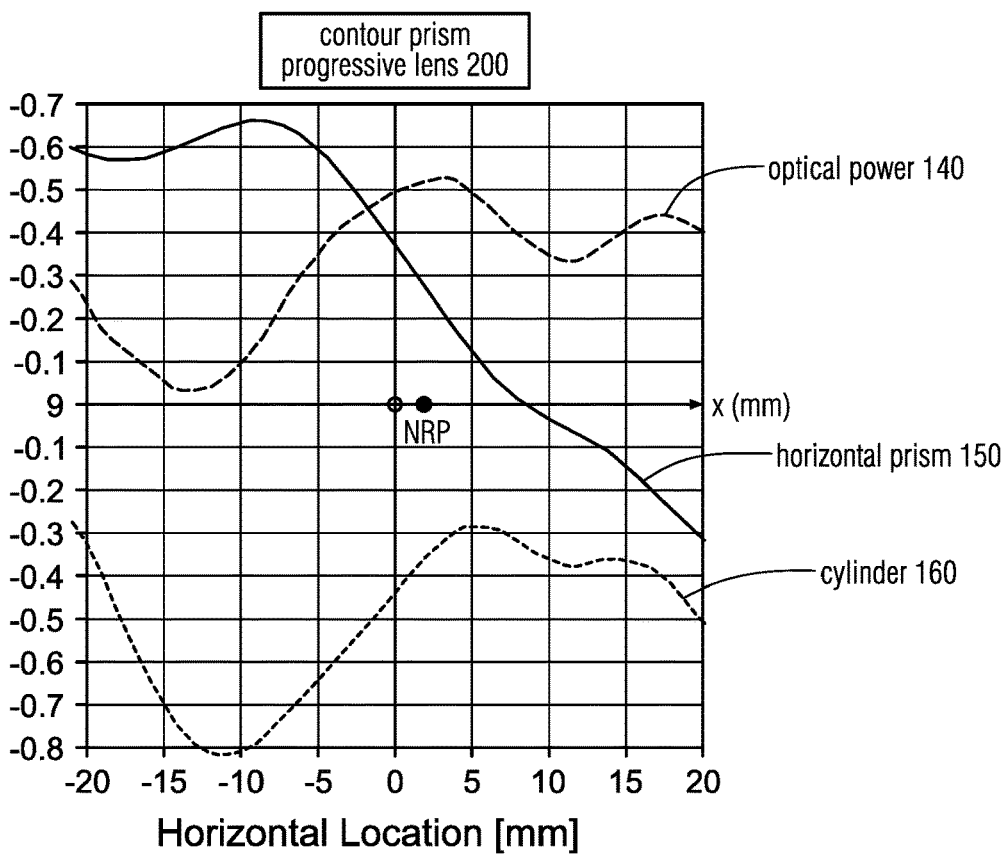
Figure 3C:
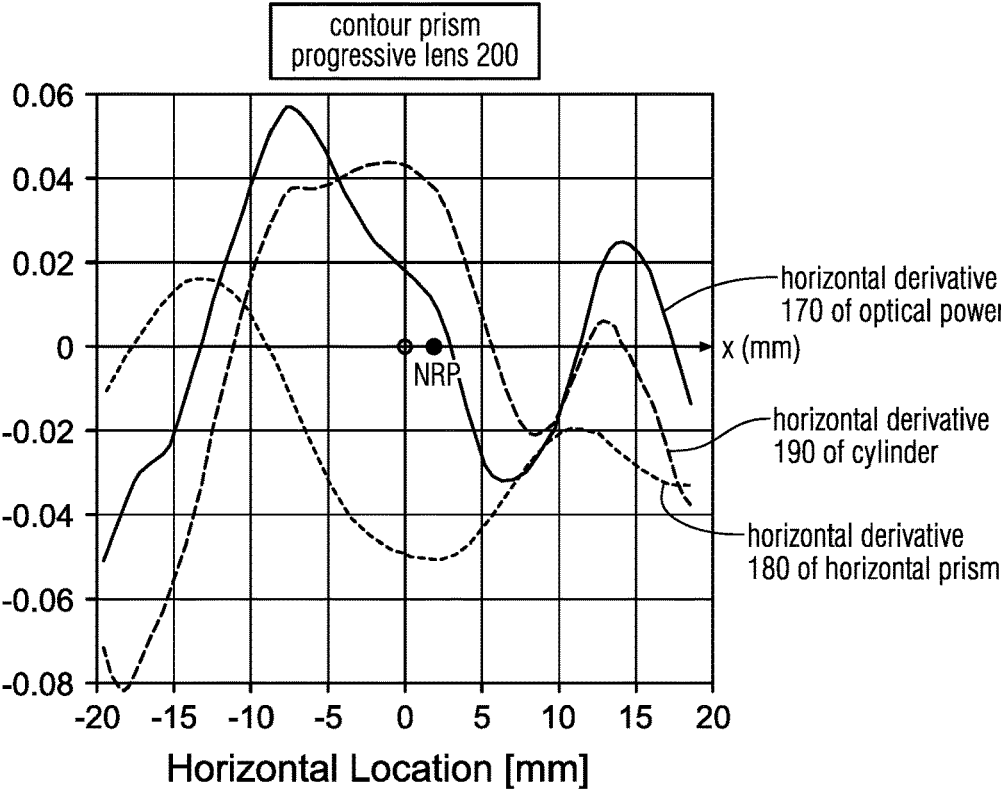

FIG. 3C bottom panels show embodiments of a contour prism progressive lens 200 with such a prismatic power plateau design. In these embodiments, the position dependent optical power 140 at the near-vision power reference point NRP 120 exceeds the optical power at the distance-vision reference point DRP 110 by a value between 0.25 diopter and 1.0 diopter. This is further evidenced by FIG. 3E. The effects of the power plateau 142 are expected to be substantial in progressive lenses where the progressive add power does not exceed the peak prismatic power, about 0.2 diopter, too much. This is one of the reasons why embodiments of the contour prism progressive lens 200 with a limited progressive add power in the range of 0.25 to 1.0 diopter are described separately next.

Figure 3D:
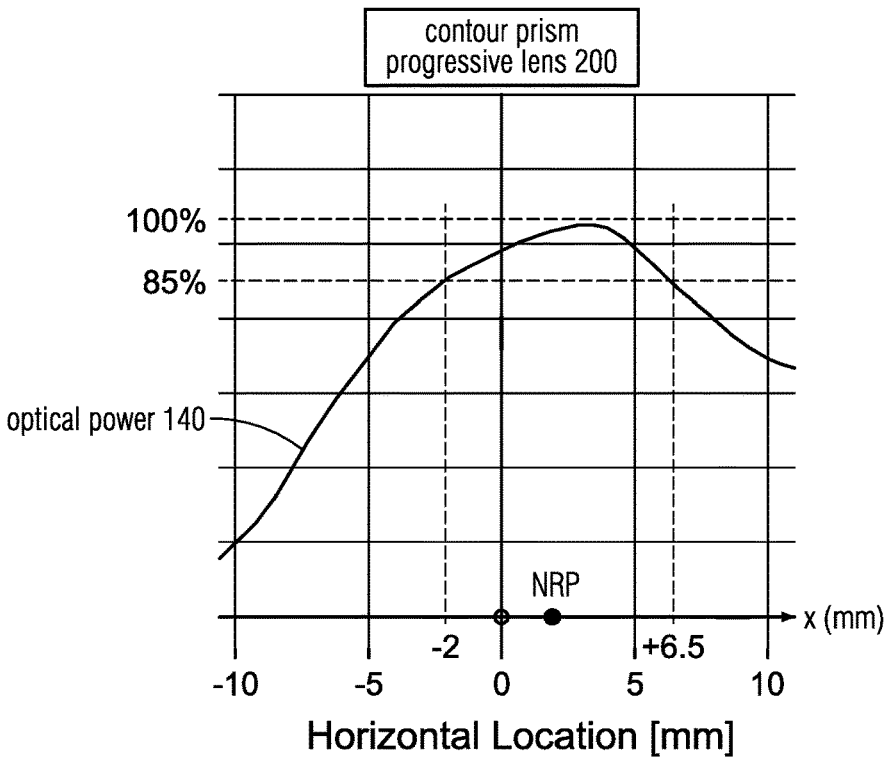
Figure 3D:
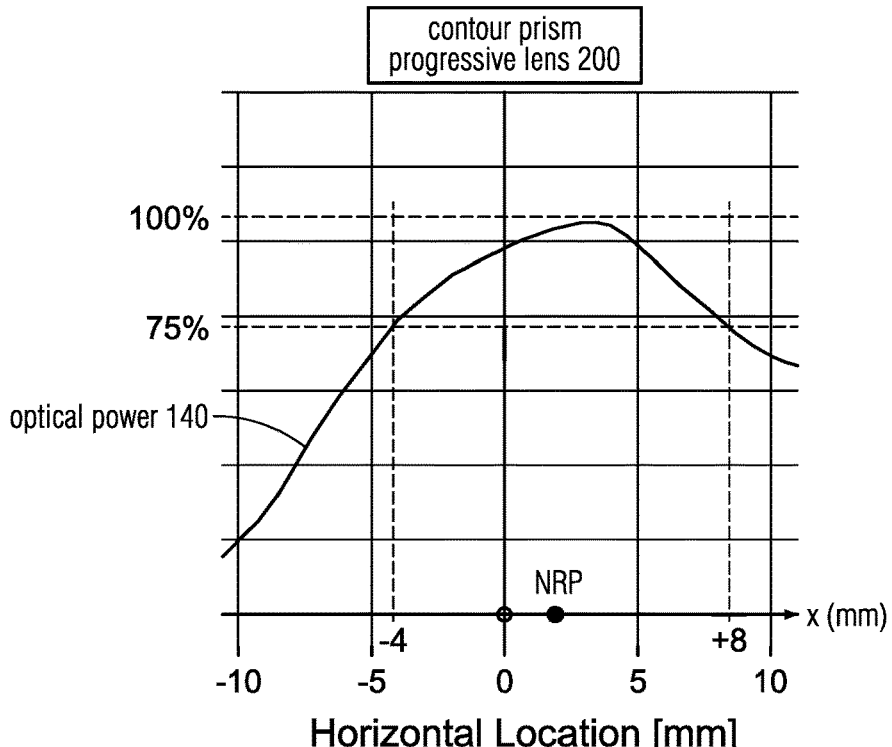

FIGS. 3C and 3D show an embodiment in which the excess optical power at the NRP 120 is between 0.5 D and 0.6 D, where D stands for diopter. In these embodiments, a horizontal prism 150 on the vertical axis at a vertical coordinate of the near-vision reference point 120 differs from the horizontal prism 150 at the distance-vision reference point by more than 0.2 prism diopter base-in; and the optical power 140 along a horizontal crosscut 130 of the contour prism progressive lens 200 through the near-vision reference point 120 has a broad maximum, where the region where the optical power is at least 85% of its peak is at least 5 mm wide.

In some embodiments of the contour prism progressive lens 200, the optical power 140 along a horizontal crosscut 130 of the contour prism progressive lens 200 through the near-vision reference point 120 has a broad maximum, where the region where the optical power is at least 85% of its peak is at least 8 mm wide. In the example in the left panel of FIG. 3D, the region where the optical power 140 is at least 85% of the peak extends from approximately x=−2 mm to x=+6.5 mm: and thus has a width of about 8.5 mm. These broad, or wide maxima of the optical power 140 are the consequence of implementing the contour prisms with the power plateau design.

FIG. 3D, right panel shows that in some embodiments of the contour prism progressive lens 200, the optical power 140 along a horizontal crosscut 130 of the contour prism progressive lens 200 through the near-vision reference point 120 has a broad maximum where the region where the optical power is at least 75% of its peak is at least 8 mm wide. In some embodiments, this region can be at least 10 mm wide. In the shown example, the optical power 140 exceeds 75% of the peak value in the region extending from about x=−4 mm to X=+8 mm, and thus has an approximately 12 mm width.

The relative flatness of the power peak in these embodiments can be also characterized by the derivative of the optical power 140 having a small magnitude. As shown in the bottom right panel of FIG. 3C, in some embodiments of the contour prism progressive lens 200, a magnitude of a horizontal derivative 170 of the optical power 140 along the horizontal crosscut 130 of the contour prism progressive lens 200 through the near-vision reference point 120 can be less than 0.02 diopter/mm over a region at least 4 mm long, comprising the NRP 120. In some embodiments, the magnitude of the horizontal derivative 170 of the optical power 140 along the horizontal crosscut 130 through the NRP 120 can be less than 0.02 diopter/mm over a region at least 5 mm long, comprising the NRP 120. In the shown example, the magnitude of the horizontal derivative 170 decreases below 0.02 diopter/mm at x=−1 mm, and increases above 0.02 diopter/mm at x=+4 mm, defining a region of approximately 5 mm long. In contrast, in existing lenses, shown in the top right panel of FIG. 3C, the analogous region extends from about x=+3 mm to about x=+6 mm, defining only a 3 mm wide region. Extending the width of the region of slow optical power change (the size of the "sweet spot", or highest visual acuity) from 3 mm to 5 mm is a 66% increase, and substantially improves the perceived visual acuity for the patient.

Yet another way to characterize the very good optical performance of these embodiments is via the value of the derivative of the optical power specifically at the NRP 120. In some embodiments of the contour prism progressive lens 200, a magnitude of a horizontal derivative 170 of the optical power 140 along the horizontal crosscut 130 of the contour prism progressive lens 200 through the near-vision reference point 120 is less than 0.03 diopter/mm at the NRP 120. In some embodiments, this horizontal derivative 170 of the optical power 140 at the NRP 120 can be less than 0.02 diopter/mm. The bottom right panel of FIG. 3C shows an embodiment of the contour prism progressive lens 200, where this horizontal derivative 170 of the optical power 140 at the NRP 120 is less than 0.01 diopter/mm. In contrast, the top right panel of FIG. 3C shows that in related existing lenses this horizontal derivative 170 of the optical power 140 at the NRP 120 is greater than 0.04 diopter/mm. In words, the optical power at the important NRP 120 varies four times faster in existing lenses than in embodiments of the contour prism progressive lens 200. Such a 75% reduction of the variation of the optical power 140 indicates a substantial improvement of the visual acuity over existing lenses.

The other major impact of implementing the power plateau 142 in contour prism progressive lenses 200 is on the location of the power peak, where the optical power 140 has its maximum. As described in relation to FIG. 3B, the power plateau 142 is expected to minimize, or even eliminate the nasal shift of this power peak, often occurring in existing lenses. Indeed, as shown in the top right panel of FIG. 3C, the peak of the optical power 140 in existing lenses-indicated by the horizontal derivative 170 of the optical power 140 crossing zero and changing sign—is shifted to x=+5 mm, 3 mm nasal from the NRP 120 at x=+2 mm. In contrast, in embodiments of the contour prism progressive lens 200 the horizontal derivative 170 of the optical power 140 crosses zero and changes sign at approximately x=+2.5 mm, barely shifted from the NRP 120, only by a few tenth of a millimeter. Visibly, switching to a power plateau 142 in these lens designs nearly completely eliminated the nasal shift of the power peak. More broadly capturing the same concept, in embodiments of the contour prism progressive lens 200, a maximum of the optical power 140 along a horizontal crosscut 130 of the contour prism progressive lens 200 through the near-vision reference point 120 can have a maximum less than 2 mm from the near-vision reference point 120.

Finally, in some embodiments of the contour prism progressive lens 200, the horizontal prism 150 is also varying more slowly than in existing lenses. As shown in the bottom right panel of FIG. 3C, in some embodiments 200 a magnitude of a horizontal derivative 180 of the horizontal prism 150 along the horizontal crosscut 130 of the contour prism progressive lens 200 through the near-vision reference point 120 can be smaller than 0.055 diopter/mm.

Figure 3E:
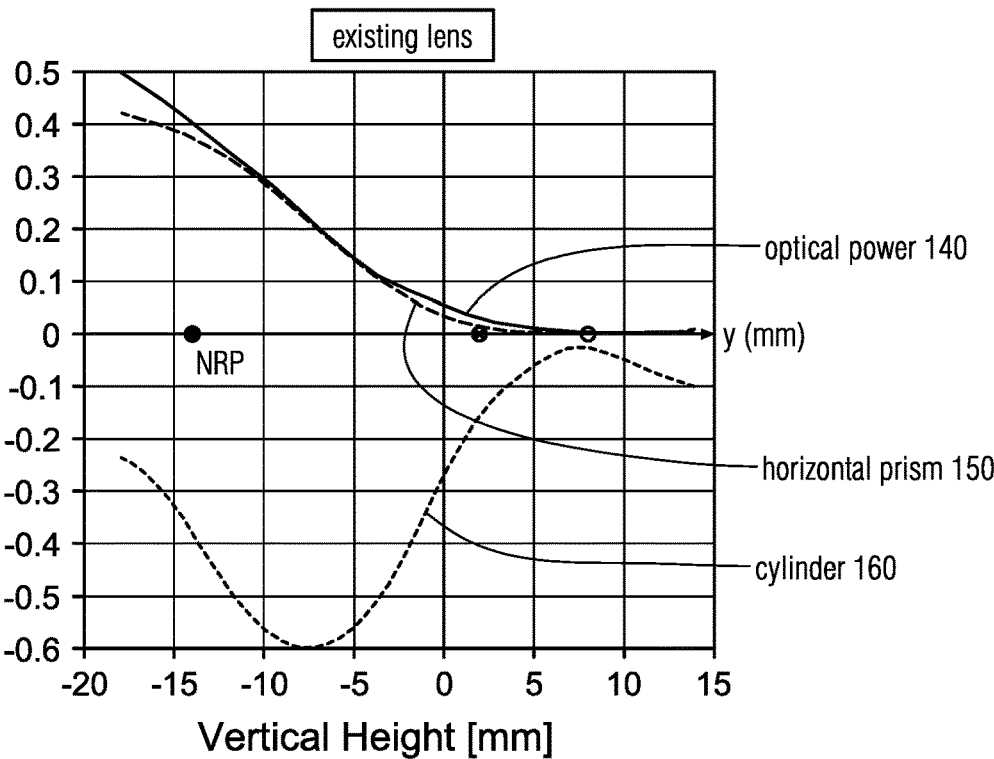
Figure 3E:
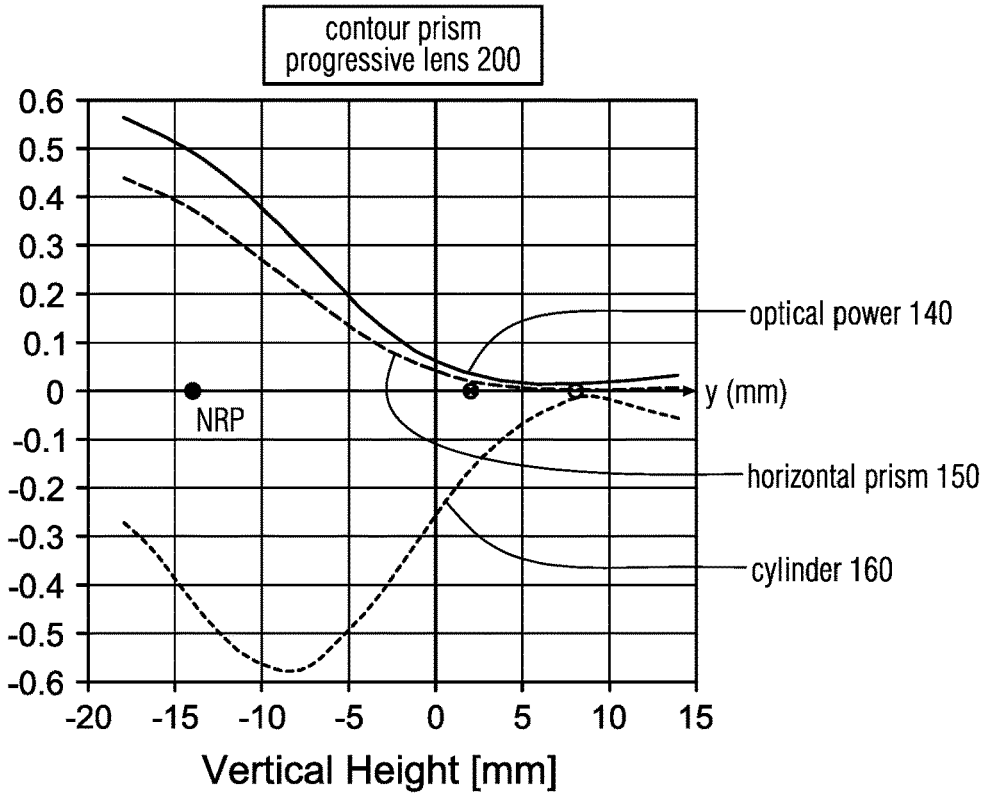

For completeness, FIG. 3E shows the vertical crosscuts of the same contour prism progressive lens 200 of FIG. 3C, along the y axis. Since the NRP 120 is off the y axis, in this graph, the "NRP" label indicates the location on the y axis that has the same y coordinate as the NRP 120 itself. Visibly, the optical power 140 at this NRP location represents an addition of about 0.5 diopter.

Figure 4A:
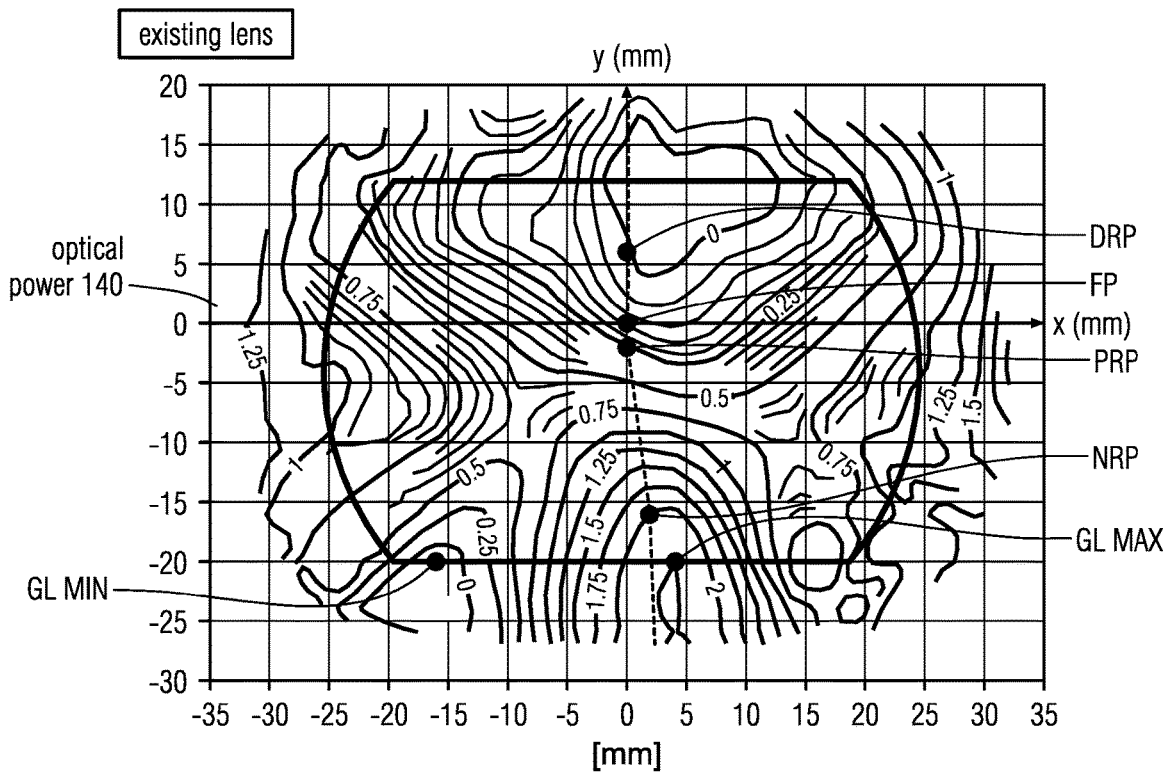
FIGS. 4A-D illustrate power maps and horizontal and vertical cross sections of optical power, horizontal prism and cylinder for contour prism progressive lenses.
Figure 4A:
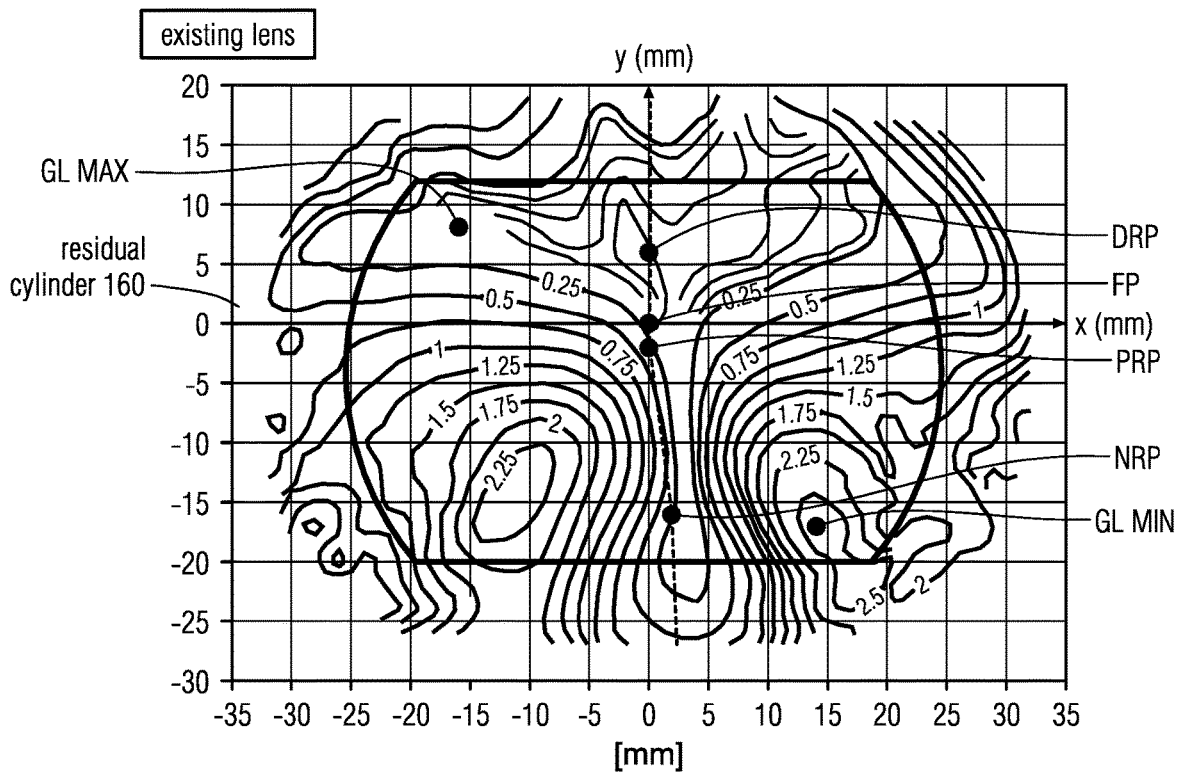
Figure 4A:
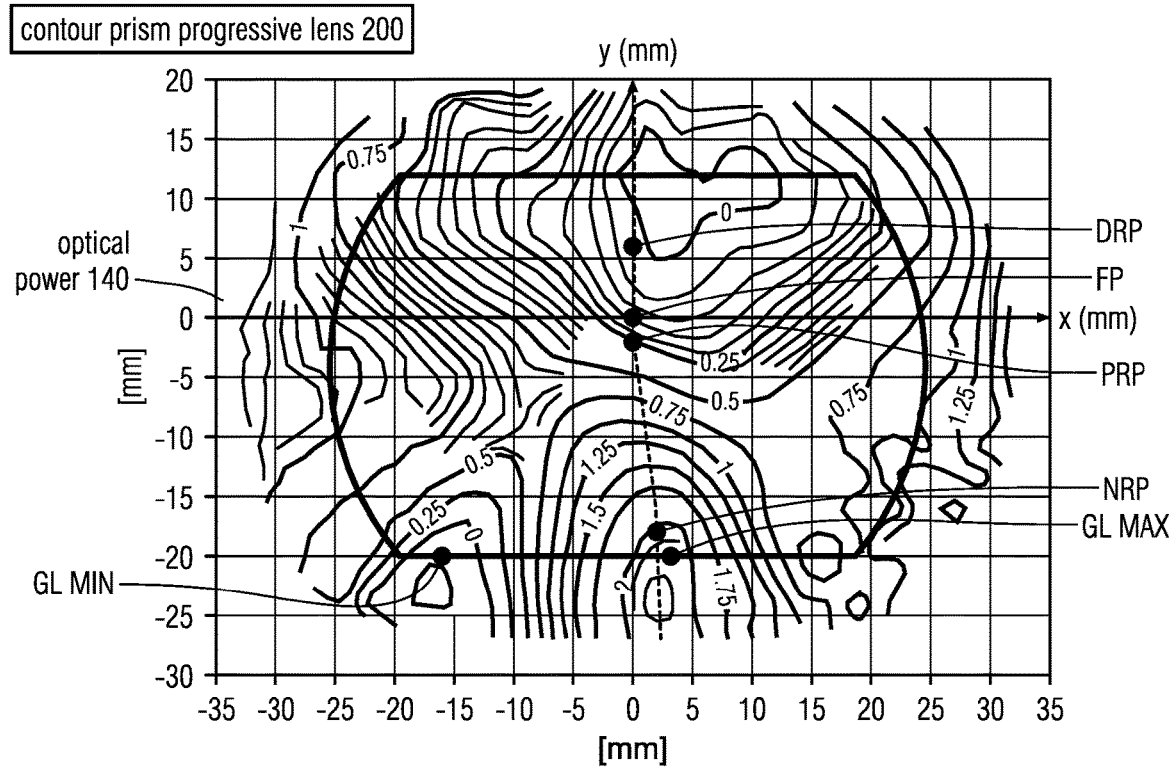
Figure 4A:
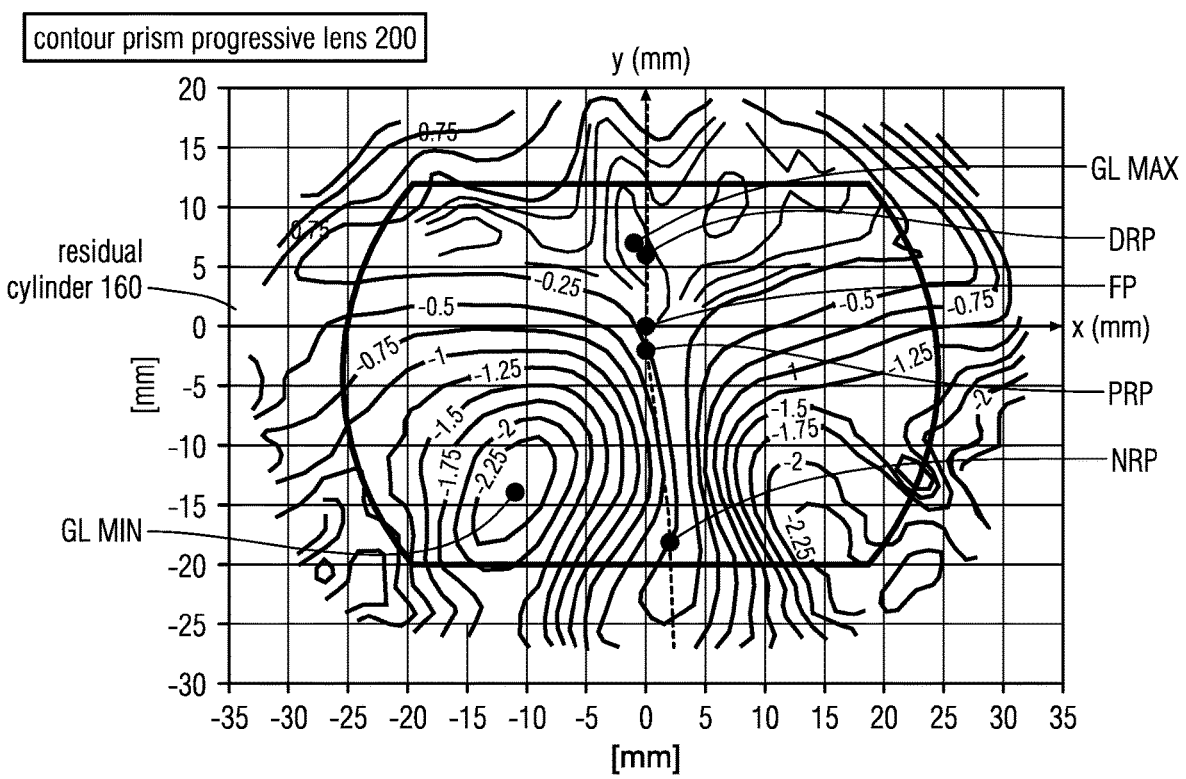
Figure 4B:
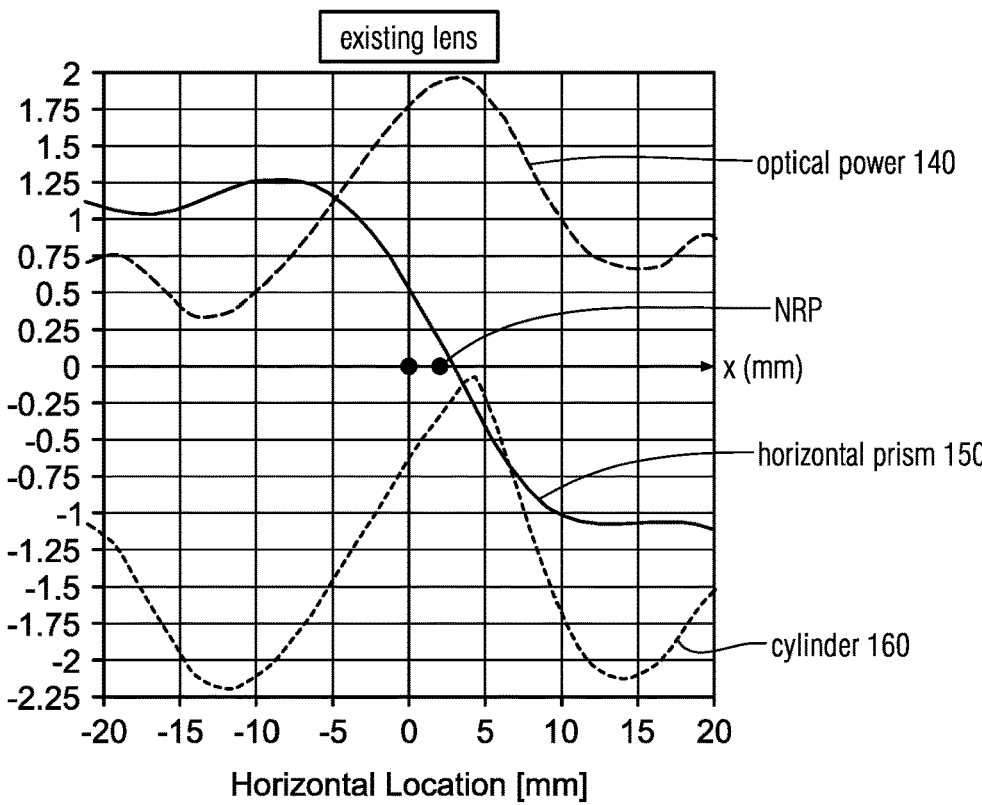
Figure 4B:
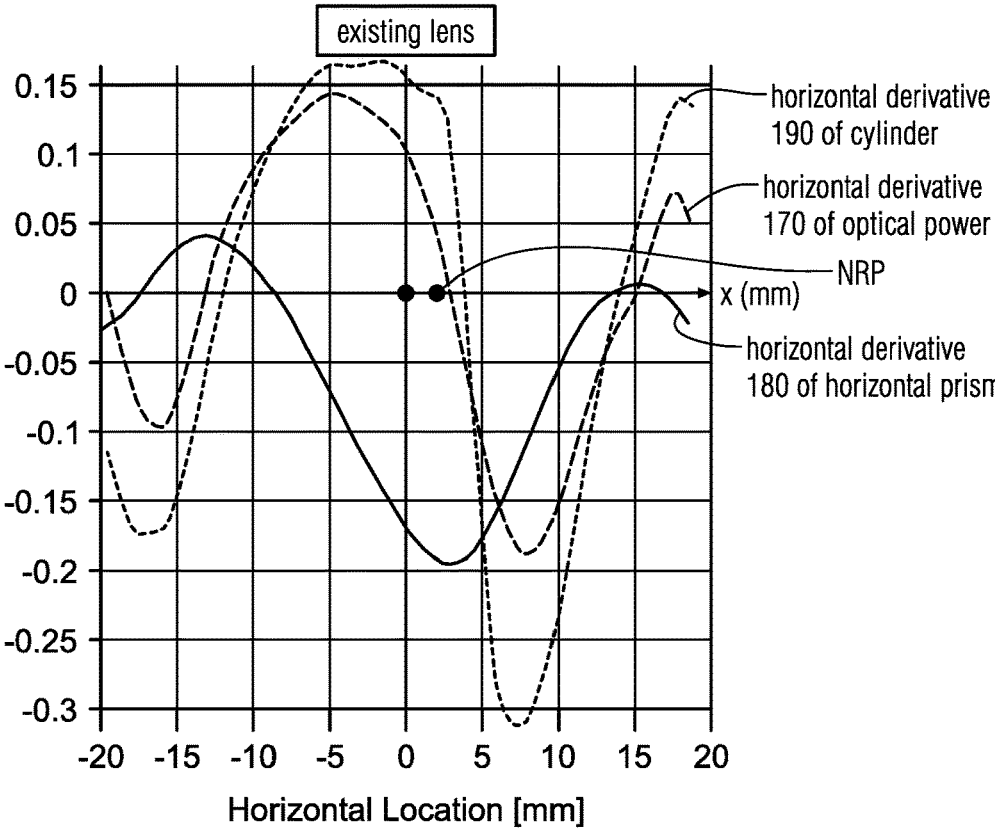
Figure 4B:
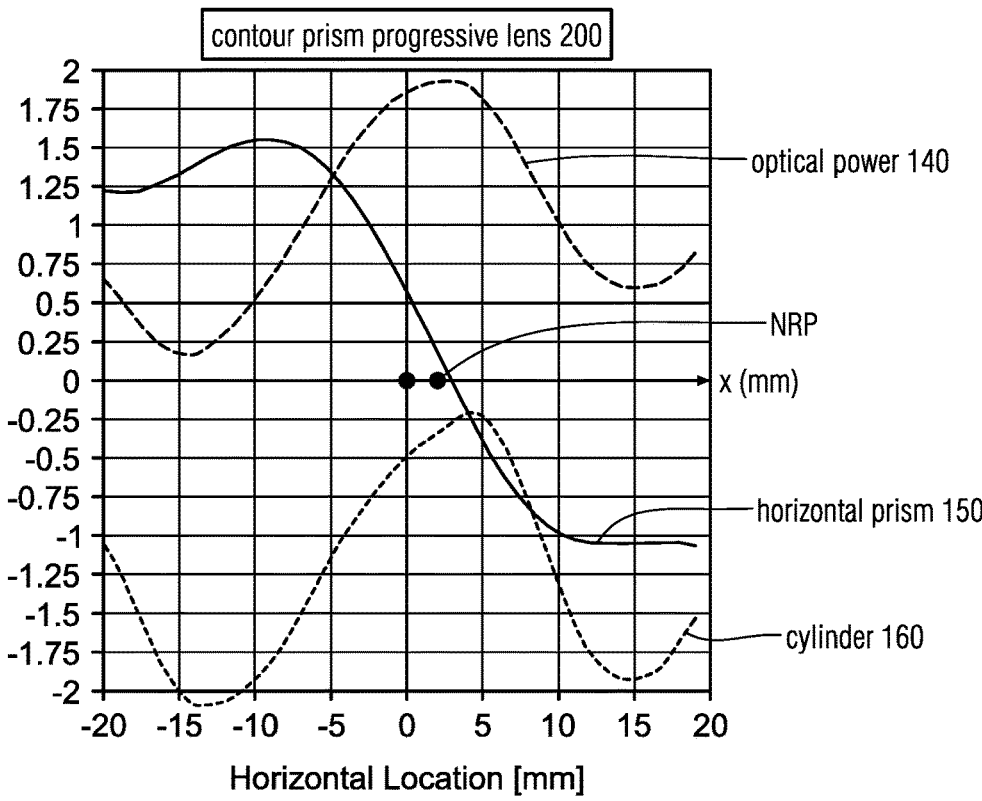
Figure 4B:
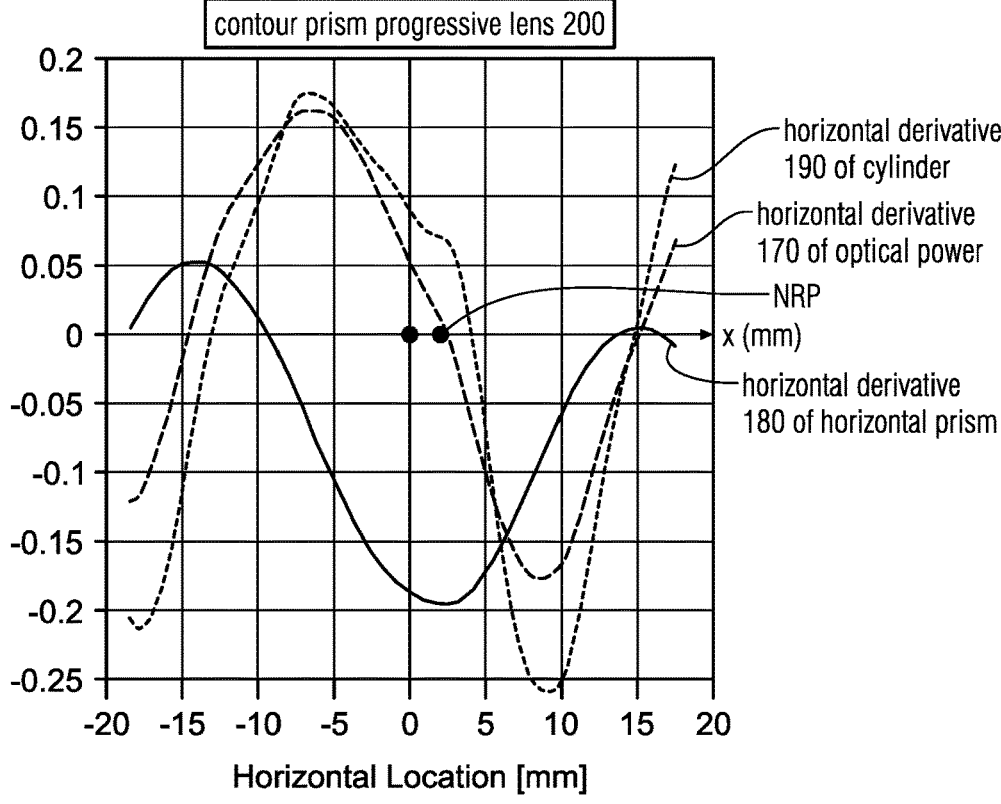

FIGS. 4A-D illustrate a related embodiment of the contour prism progressive lens 200, again in the context of existing lenses. As before, these embodiments are designed by implementing the contour prism with the addition of the power plateau 142 of FIG. 2B, bottom panel, to a progressive lens optical design. Such designs are expected to bring improvements to the challenges of the existing lenses that were created by implementing the contour prism with the design of the top panel of FIG. 2B. They differ from the embodiments in FIG. 3A-E in that the add power of these progressive lenses is greater: it is in the 1.0-2.5 diopter range. As such, the add power is considerably greater than the about 0.2 diopter of the prismatic maximum of the power plateau, and accordingly, the impact of switching to the power plateau design is somewhat more limited. Nevertheless, in some embodiments of these contour prism progressive lenses 200, having a position dependent optical power 140 and a position dependent horizontal prism 150, and having a distance-vision reference point 110 and a near-vision reference point 120, the contour prism progressive lens 200 can be characterized by an optical power 140 at the NRP 120 exceeding the optical power 140 at the DRP 110 by a value between 1.0 diopter and 2.5 diopter; the horizontal prism 150 on the vertical axis at a vertical coordinate of the NRP 120 differing from the horizontal prism 150 at the DRP 110 by more than 0.2 prism diopter base-in; and the optical power 140 along a horizontal crosscut 130 of the contour prism progressive lens 200 through the NRP 120 having a broad maximum where the region where the optical power 140 is at least 85% of the peak is at least 8 mm wide. In some embodiments, this region where the optical power 140 is at least 85% of its peak value is at least 10 mm wide. FIG. 4B, bottom left panel, and FIG. 4C, left panel show an embodiment of the contour prism progressive lens 200, where this "at least 85% of peak" region extends from x=−2.5 mm to x=+6 mm, and thus has a width of 8.5 mm.

Figure 4C:
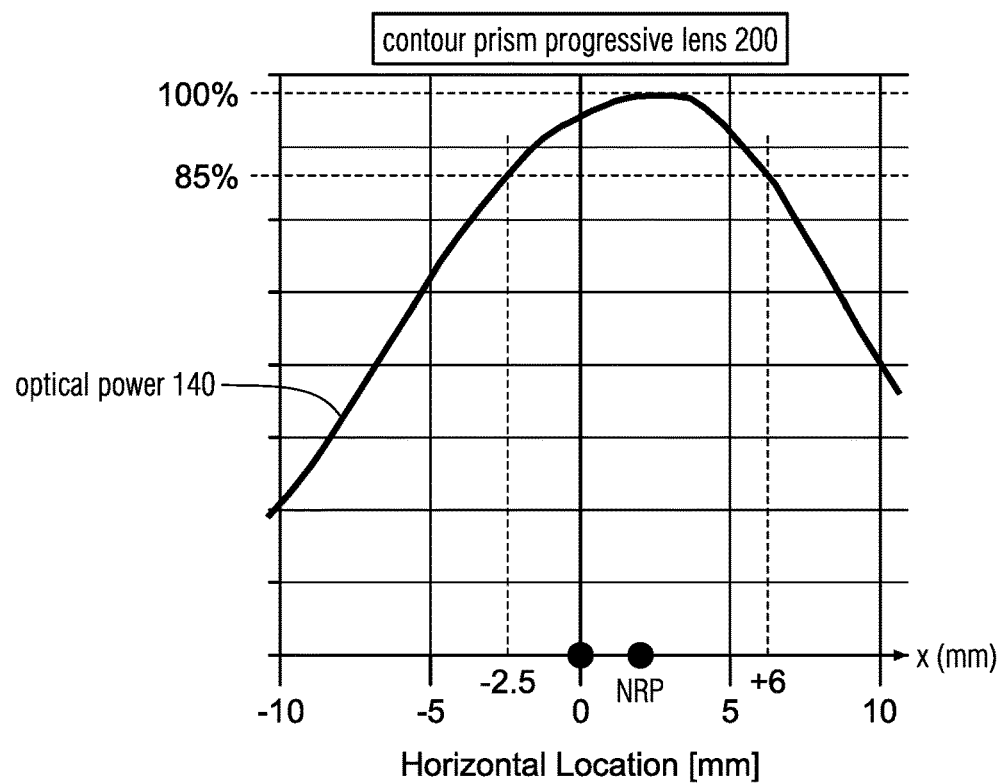
Figure 4C:
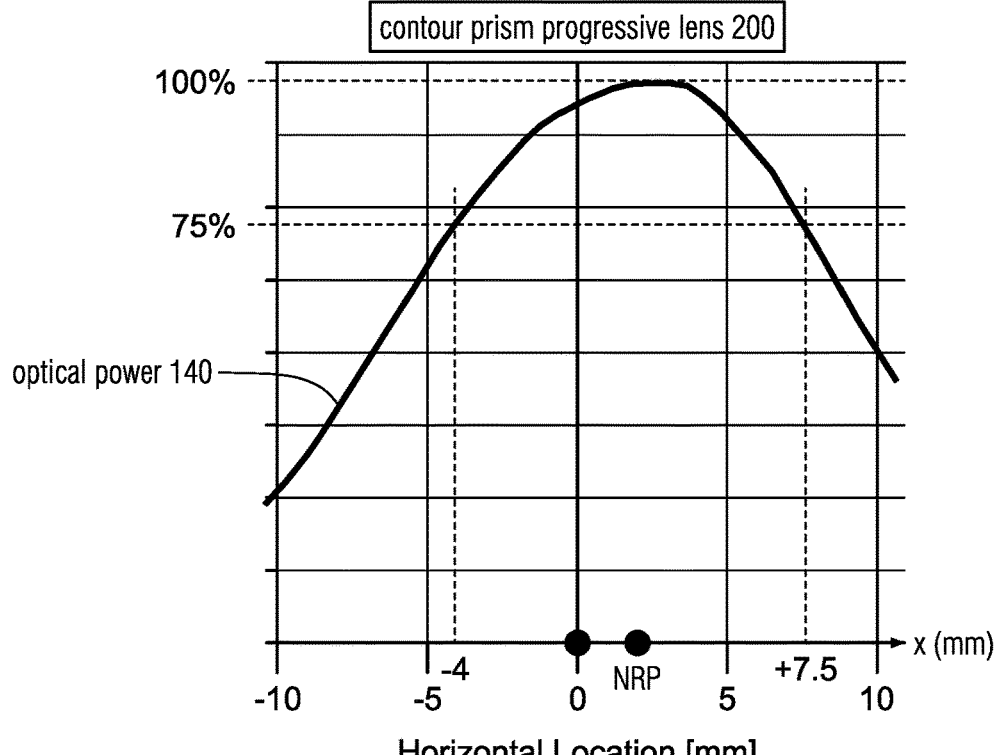

FIG. 4B bottom left and FIG. 4C, right panels show an embodiment of the contour prism progressive lens 200, wherein the optical power 140 along a horizontal crosscut 130 of the contour prism progressive lens 200 through the NRP 120 has a broad maximum where the region where the optical power 140 is at least 75% of the peak is at least 10 mm wide. In some embodiments, this region where the optical power is at least 75% of its peak value is at least 12 mm wide. FIG. 4B, bottom left panel, and FIG. 4C, right panels show an embodiment of the contour prism progressive lens 200, where this "at least 75% of peak" region extends from x=−4 mm to x=+7.5 mm, and thus has a width of 11.5 mm.

FIG. 4B bottom right panel shows that in some embodiments of the contour prism progressive lens 200 a magnitude of a horizontal derivative 170 of the optical power 140 along the horizontal crosscut 130 of the contour prism progressive lens 200 through the NRP 120 is less than 0.1 diopter/mm over a region that is more than 5 mm long, comprising the NRP 120 itself. In some embodiments, this region is more than 7 mm long. In the bottom right panel of FIG. 4B, this region extends approximately from x=−2 mm to x=+5 mm, and thus has a width of about 7 mm. This is another way to capture that the maximum of the optical power 140 is broadened in these embodiments where the contour prism has been implemented with the addition of the power plateau 142.

Yet another way to capture the broad maximum of the optical power 140 is to spell out that in embodiments of the contour prism progressive lens 200, the magnitude of a horizontal derivative 170 of the optical power 140 along the horizontal crosscut 130 of the contour prism progressive lens 200 through the NRP 120 is less than 0.05 diopter/mm at the NRP 120. In some embodiments, this derivative 170 is less than 0.03 diopter/mm at the NRP 120. In the bottom right panel of FIG. 4B, the horizontal derivative 170 of the optical power 140 at the NRP 120 is between 0.01 diopter/mm and 0.02 diopter/mm.

To summarize the above, one benefit of implementing the contour prism by adding a prismatic power component with a power plateau 142 to a regular progressive power component is that such designs make the power maximum broader, thereby increasing viewer comfort. The other benefit of such designs is that the power peak, the x coordinate of the maximum of the optical power 140, is approximately not shifted nasally from the NRP 120. Indeed, the top right panel of FIG. 4B shows that in existing lenses, the zero crossing of the horizontal derivative 170 of the optical power 140 is nasally shifted from the NRP 120 by more than 1 mm, whereas in the bottom right panel of FIG. 4B shows that in embodiments of the contour prism progressive lens 200, the zero crossing of the horizontal derivative 170 of the optical power 140 essentially coincides with the NRP 120.

Figure 4D:
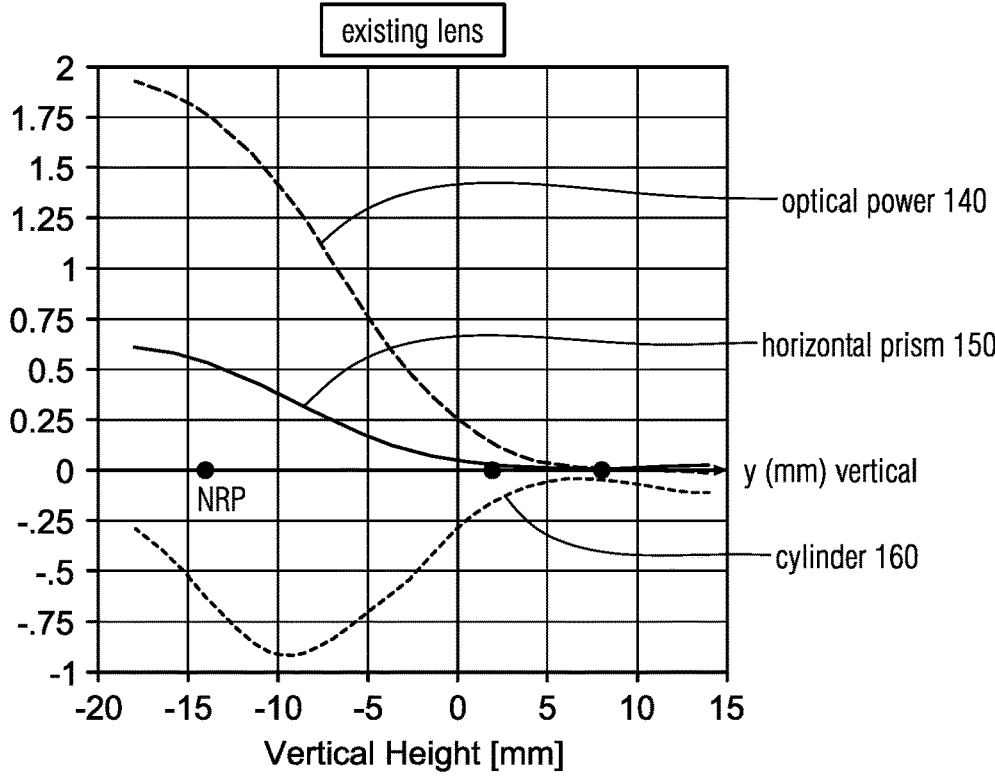
Figure 4D:
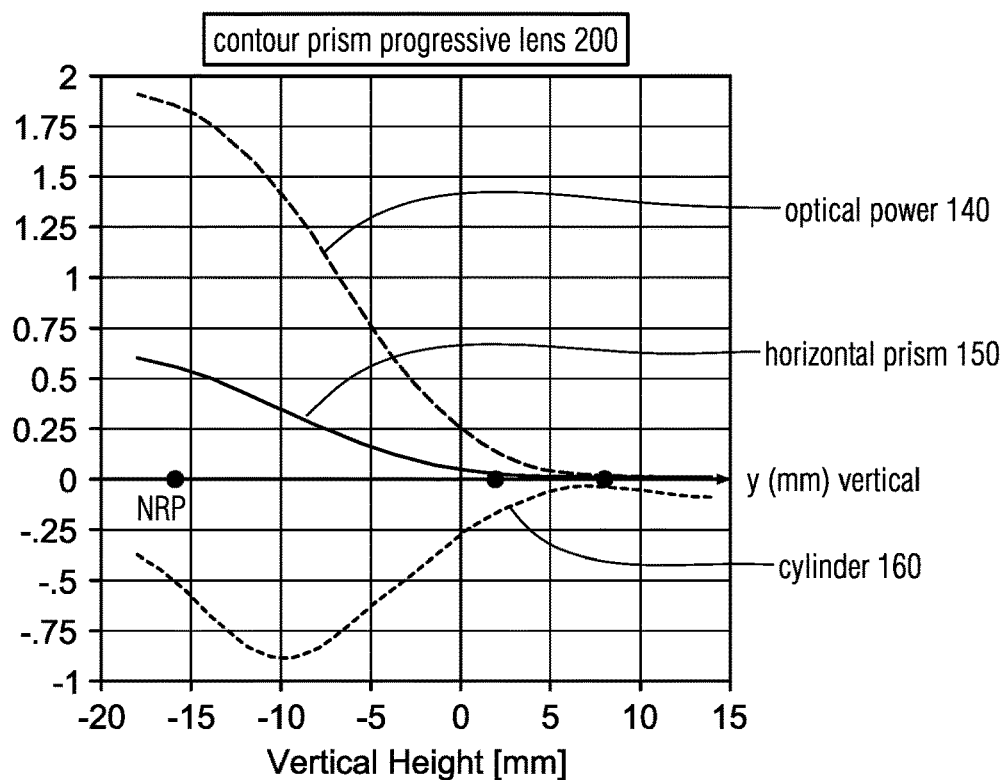

As before, FIG. 4D completes the description of the contour prism progressive lens 200 with showing a vertical crosscut of the various maps along the y axis. At the y coordinate of the NRP 120, but on the y axis itself, the add power is about 1.8 diopter.

In all the above-described embodiments of the contour prism lens 100 and contour prism progressive lens 200, the horizontal prism 150 on the vertical axis at the vertical/y coordinate of the NRP 120 can differ from the horizontal prism 150 at the DRP 110 by an amount in the range of 0.2-1.0 prism diopter base-in. In some embodiments, this range can be 0.3-0.8 prism diopter base-in.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

The invention claimed is:

1. A contour prism progressive lens, having a position dependent optical power and a position dependent horizontal prism, and having a distance-vision reference point and a near-vision reference point, the contour prism progressive lens being characterized by a coordinate system with its vertical axis running through the distance-vision reference point, wherein:

the optical power at the near-vision power reference point exceeds the optical power at the distance-vision reference point by a value between 1.0 diopter and 2.5 diopters;

the horizontal prism on the vertical axis at a vertical coordinate of the near-vision reference point differs from the horizontal prism at the distance-vision reference point by more than 0.2 prism diopter base-in; and the optical power along a horizontal crosscut of the contour prism progressive lens through the near-vision reference point has a broad peak where the region where the optical power is at least 85% of its peak value is at least 8 mm wide; wherein the horizontal crosscut is oriented laterally in the coordinate system.

2. The contour prism progressive lens of claim 1, wherein:

the optical power along a horizontal crosscut of the contour prism progressive lens through the near-vision reference point has a broad peak where the region where the optical power is at least 85% of its peak value is at least 10 mm wide.

3. The contour prism progressive lens of claim 1, wherein:

the optical power along a horizontal crosscut of the contour prism progressive lens through the near-vision reference point has a peak where the region where the optical power is at least 75% of its peak value is at least 10 mm wide.

4. The contour prism progressive lens of claim 1, wherein:
the optical power along a horizontal crosscut of the contour prism progressive lens through the near-vision reference point has a peak where the region where the optical power is at least 75% of its peak value is at least 12 mm wide.

5. The contour prism progressive lens of claim 1, wherein:
a magnitude of a horizontal derivative of the optical power along the horizontal crosscut of the contour prism progressive lens through the near-vision reference point is less than 0.1 diopter/mm over a region more than 5 mm long, comprising the near-vision reference point.

6. The contour prism progressive lens of claim 1, wherein:
a magnitude of a horizontal derivative of the optical power along the horizontal crosscut of the contour prism progressive lens through the near-vision reference point is less than 0.1 diopter/mm over a region at least 7 mm long, comprising the near-vision reference point.

7. The contour prism progressive lens of claim 1, wherein:
a magnitude of a horizontal derivative of the optical power along the horizontal crosscut of the contour prism progressive lens through the near-vision reference point is less than 0.05 diopter/mm at the near-vision reference point.

8. The contour prism progressive lens of claim 1, wherein:
a magnitude of a horizontal derivative of the optical power along the horizontal crosscut of the contour prism progressive lens through the near-vision reference point is less than 0.03 diopter/mm at the near-vision reference point.

* * * * *